US008681036B2

(12) United States Patent
Beer et al.

(10) Patent No.: US 8,681,036 B2
(45) Date of Patent: Mar. 25, 2014

(54) DISTRIBUTED ROAD ASSESSMENT SYSTEM

(75) Inventors: N. Reginald Beer, Pleasanton, CA (US); David W. Paglieroni, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 262 days.

(21) Appl. No.: 13/219,430

(22) Filed: Aug. 26, 2011

(65) Prior Publication Data

US 2013/0082857 A1    Apr. 4, 2013

Related U.S. Application Data

(60) Provisional application No. 61/377,319, filed on Aug. 26, 2010, provisional application No. 61/377,324, filed on Aug. 26, 2010.

(51) Int. Cl.
| | | |
|---|---|---|
| G01S 13/88 | (2006.01) | |
| G01V 3/12 | (2006.01) | |
| G01S 13/89 | (2006.01) | |
| G01V 3/15 | (2006.01) | |

(52) U.S. Cl.
CPC ............. G01S 13/885 (2013.01); G01S 13/89 (2013.01); G01V 3/12 (2013.01); G01V 3/15 (2013.01)
USPC ............................ 342/22; 342/27; 701/409

(58) Field of Classification Search
CPC ..... G01S 13/885; G01S 13/89; G01S 13/887; G01S 13/56; G01S 13/86; G01S 7/003; G01V 3/12; G01V 3/15
USPC ....................... 342/22, 27; 701/409
See application file for complete search history.

(56) References Cited

U.S. PATENT DOCUMENTS 4,698,634 A * 10/1987 Alongi et al. ................. 342/22
5,796,363 A    8/1998 Mast
(Continued)

FOREIGN PATENT DOCUMENTS

EP       534730 A1 *  3/1993
JP      05087945 A  *  4/1993
(Continued)

OTHER PUBLICATIONS

U.S. Appl. No. 13/219,504, filed Aug. 26, 2011, Chambers et al.
(Continued)

*Primary Examiner* — John B Sotomayor
(74) *Attorney, Agent, or Firm* — Perkins Coie LLP

(57) ABSTRACT

A system that detects damage on or below the surface of a paved structure or pavement is provided. A distributed road assessment system includes road assessment pods and a road assessment server. Each road assessment pod includes a ground-penetrating radar antenna array and a detection system that detects road damage from the return signals as the vehicle on which the pod is mounted travels down a road. Each road assessment pod transmits to the road assessment server occurrence information describing each occurrence of road damage that is newly detected on a current scan of a road. The road assessment server maintains a road damage database of occurrence information describing the previously detected occurrences of road damage. After the road assessment server receives occurrence information for newly detected occurrences of road damage for a portion of a road, the road assessment server determines which newly detected occurrences correspond to which previously detected occurrences of road damage.

19 Claims, 19 Drawing Sheets

(56) References Cited

U.S. PATENT DOCUMENTS

| | | | | |
|---|---|---|---|---|
| 5,835,054 | A | * | 11/1998 | Warhus et al. .................. 342/22 |
| 6,975,942 | B2 | * | 12/2005 | Young et al. ...................... 702/5 |
| 7,834,806 | B2 | * | 11/2010 | Tucker et al. ............ 342/357.64 |
| 2007/0188371 | A1 | | 8/2007 | Callison |
| 2010/0036595 | A1 | * | 2/2010 | Coy et al. ...................... 701/119 |
| 2010/0045517 | A1 | * | 2/2010 | Tucker et al. ............ 342/357.08 |
| 2010/0052971 | A1 | * | 3/2010 | Amarillas ....................... 342/22 |
| 2013/0018575 | A1 | * | 1/2013 | Birken et al. .................. 701/409 |
| 2013/0082856 | A1 | | 4/2013 | Paglieroni et al. |
| 2013/0082857 | A1 | * | 4/2013 | Beer et al. ....................... 342/22 |
| 2013/0082858 | A1 | | 4/2013 | Chambers et al. |
| 2013/0082859 | A1 | | 4/2013 | Paglieroni et al. |
| 2013/0082860 | A1 | | 4/2013 | Paglieroni et al. |
| 2013/0082861 | A1 | | 4/2013 | Paglieroni et al. |
| 2013/0082862 | A1 | | 4/2013 | Paglieroni et al. |
| 2013/0082863 | A1 | | 4/2013 | Paglieroni et al. |
| 2013/0082864 | A1 | * | 4/2013 | Paglieroni et al. .............. 342/22 |
| 2013/0082870 | A1 | | 4/2013 | Chambers et al. |
| 2013/0085982 | A1 | * | 4/2013 | Paglieroni et al. .............. 706/52 |

FOREIGN PATENT DOCUMENTS

| | | | | |
|---|---|---|---|---|
| JP | 2002322610 | A | * | 11/2002 |
| JP | 2011032853 | A | * | 2/2011 |
| JP | 2012184624 | A | * | 9/2012 |
| WO | WO 2010093426 | A2 | * | 8/2010 |

OTHER PUBLICATIONS

Aliferis, I. et al., "Comparison of the diffraction stack and time-reversal imaging algorithms applied to short-range UWB scattering data," *Proc. IEEE Int. Conf. Ultra-Wideband*, Singapore, pp. 618-621, 2007.

Ammari, H. et al., "MUSIC-type electromagnetic imaging of a collection of small three-dimensional inclusions," *SIAM J. Sci. Comput.*, vol. 29, No. 2, pp. 674-709, 2007.

Ammari, H. et al., "A MUSIC algorithm for locating small inclusions buried in a half-space from the scattering amplitude at a fixed frequency," *Multiscale Model. Simul.*, vol. 3, No. 3, pp. 597-628, 2005.

Beer, N.R. et al., "Computational system for detecting buried objects in subsurface tomography images reconstructed from multistatic ultra wideband ground penetrating radar data," *LLNL*-12311, pp. 1-11, 2010.

Belkebir, K., Bonnard, S. et al., "Validation of 2D inverse scattering algorithms from multi-frequency experimental data," *J. Electromag. Waves App.*, vol. 14:1637-1667, 2000.

Bellomo, L. et al., "Time reversal experiments in the microwave range: description of the radar and results," *Prog. Electromag. Res.*, vol. 104, pp. 427-448, 2010.

Chambers, D.H., "Target characterization using time-reversal symmetry of wave propagation," *Int. J. Mod. Phys. B*, vol. 21, No. 20, pp. 3511-3555, 2007.

Chambers, D.H. and J.G. Berryman, "Analysis of the time-reversal operator for a small spherical scatterer in an electromagnetic field," *IEEE Trans. Ant. Prop.*, vol. 52, No. 7, pp. 1729-1738, 2004.

Chambers, D.H. and J.G. Berryman, "Target characterization using decomposition of the time-reversal operator: electromagnetic scattering from small ellipsoids," *Inv. Prob.*, vol. 22, pp. 2145-2163, 2006.

Chambers, D.H. and J.G. Berryman, "Time-reversal analysis for scatterer characterization," *Phys. Rev. Lett.*, vol. 92, No. 2, pp. 023902-1-023902-4, 2004.

Chan, K.P. and Y.S. Cheung, "Fuzzy-attribute graph with application to chinese character recognition," *IEEE Transactions on Systems, Man, and Cybernetics*, vol. 22, No. 1:153-160, Jan./Feb. 1992.

Chatelée, V. et al., "Real data microwave imaging and time reversal," *IEEE APS Int. Symp.*, pp. 1793-1796, 2007.

Chauveau, J. et al., "Determination of resonance poles of radar targets in narrow frequency bands," *Proc. 4th Euro. Radar Conf.*, Munich, pp. 122-125, 2007.

Cmielewski, O. et al., "A two-step procedure for characterizing obstacles under a rough surface from bistatic measurements," *IEEE Trans. Geos. Rem. Sens.*, vol. 45, No. 9, pp. 2850-2858, 2007.

Counts, T. et al., "Multistatic ground-penetrating radar experiments," *IEEE Trans. Geos. Rem. Sens.*, vol. 45, No. 8, pp. 2544-2553, 2007.

Cresp, A. et al., "Investigation of time-reversal processing for surface-penetrating radar detection in a multiple-target configuration," *Proc. 5th Euro. Radar Conf.*, Amsterdam, pp. 144-147, 2008.

Cresp, A. et al., "Time-domain processing of electromagnetic data for multiple-target detection," *Conf. Math. Mod. Wave Phen.*, pp. 204-213, 2009.

Cresp, A. et al., "Comparison of the time-reversal and SEABED imaging algorithms applied on ultra-wideband experimental SAR data," *Proc. 7th Euro. Radar Conf.*, Paris, pp. 360-363, 2010.

Daniels, D.J., "Ground penetrating radar for buried landmine and IED detection," *Unexploded Ordnance Detection and Mitigation*, J. Byrnes (ed.), Springer, pp. 89-111, 2009.

Daniels, D.J., "A review of GPR for landmine detection," *Int. J. Sens. Imag.*, vol. 7, No. 3, pp. 90-123, 2006.

Daniels, D.J., "An assessment of the fundamental performance of GPR against buried landmines," *Detection and Remediation Technologies for Mines and Minelike Targets XII, Proc. SPIE*, vol. 6553, pp. 65530G-1-65530G-15, 2007.

Daniels, D.J. et al., "Classification of landmines using GPR," *IEEE Radar '08, Proceedings*, pp. 1-6, 2008.

Devaney, A.J., "Time reversal imaging of obscured targets from multistatic data," *IEEE Trans. Ant. Prop.*, vol. 53, No. 5, pp. 1600-1619. May 2005.

Dubois, A. et al., "Localization and characterization of two-dimensional targets buried in a cluttered environment," *Inv. Prob.*, vol. 20, pp. S63-S79, 2004.

Dubois, A. et al., "Retrieval of inhomogeneous targets from experimental frequency diversity data," *Inv. Prob.*, vol. 21, pp. S65-S79, 2005.

Dubois, A. et al., "Imaging of dielectric cylinders from experimental stepped frequency data," *Appl. Phys. Lett.*, vol. 88, pp. 64104-1-164104-3, 2006.

Feng, X. and M. Sato, "Pre-stack migration applied to GPR for landmine detection," *Inv. Prob.*, vol. 20, pp. S99-S115, 2004.

Fink, M. et al., "Time-reversed acoustics," *Rep. Prog. Phys.*, vol. 63:1933-1995, 2000.

Fink, M. and C. Prada, "Acoustic time-reversal mirrors," *Inv. Prob.*, vol. 17, pp. R1-R38, 2001.

Gader, P. et al., "Detecting landmines with ground-penetrating radar using feature-based rules, order statistics, and adaptive whitening," *Trans. Geos. Rem. Sens.*, vol. 42, No. 11, pp. 2522-2534, 2004.

Gaunaurd, G.C. and L.H. Nguyen, "Detection of land-mines using ultra-wideband radar data and time-frequency signal analysis," *IEE Proc. Radar Sonar Navig.*, vol. 151, No. 5, pp. 307-316, 2004.

Gilmore, C. et al., "Derivation and comparison of SAR and frequency-wavenumber migration within a common inverse scalar wave problem formulation," *IEEE Trans. Geos. Rem. Sens.*, vol. 44, No. 6, pp. 1454-1461, 2006.

Grove, A.J. et al., "General convergence results for linear discriminant updates," *Proc. COLT 97*, ACM press, pp. 171-183, 1997.

Iakovleva E. et al., "Multistatic response matrix of a 3-D inclusion in half space and MUSIC imaging," *IEEE Trans. Ant. Prop.*, vol. 55, pp. 2598-2607, 2007.

Iakovleva, E. and D. Lesselier, "Multistatic response matrix of spherical scatterers and the back propagation of singular fields," *IEEE Trans. Ant. Prop.*, vol. 56, No. 3, pp. 825-833, 2008.

Jofre, L. et al., "UWB tomographic radar imaging of penetrable and impenetrable objects," *Proc. IEEE*, vol. 97, No. 2, pp. 451-464, 2009.

Kuhn, H.W., "The Hungarian method for the assignment problem," *Naval Research Logistics Quarterly*, 2:83-97, 1955.

Lee, W-H. et al., "Optimizing the area under a receiver operating characteristic curve with application to landmine detection," *IEEE Trans. Geos. Rem. Sens.*, vol. 45, No. 2, pp. 389-397, 2007.

Mast, J.E. and E.M. Johansson, "Three-dimensional ground penetrating radar imaging using multi-frequency diffraction tomography," *SPIE*, vol. 2275, pp. 196-204, 1994.

(56) References Cited

OTHER PUBLICATIONS

Johansson, E.M. and J. Mast, "Three-dimensional ground penetrating radar imaging using synthetic aperture time-domain focusing," *SPIE*, vol. 2275, pp. 205-214, 1994.

Micolau, G. and M. Saillard, "DORT method as applied to electromagnetic subsurface imaging," *Radio Sci.*, vol. 38, No. 3, 1038, pp. 4-1-4-12, 2003.

Micolau, G. et al., "DORT method as applied to ultrawideband signals for detection of buried objects," *IEEE Trans. Geos. Rem. Sens.*, vol. 41, No. 8, pp. 1813-1820, 2003.

Paglieroni, D. and F. Nekoogar, "Matching random tree models of spatio-temporal patterns to tables or graphs," *IEEE Symposium on Computational Intelligence and Data Mining*, pp. 1-8. Apr. 1-5, 2007.

Paglieroni, D., and K. Ni, "DART Queries," *IEEE Transactions on Knowledge and Data Engineering, in Revision*, LLNL-JRNL-418760, 2010.

Paglieroni, D.W. et al., "DART-based threat assessment for buried objects Detected with a ground penetrating radar over time," LLNL, pp. 1-7, 2010.

Prada, C. and M. Fink, "Eigenmodes of the time reversal operator: A solution to selective focusing in multiple-target media," *Wave Motion*, vol. 20, pp. 151-163, 1994.

Saillard, M. et al., "Reconstruction of buried objects surrounded by small inhomogeneities," *Inv. Prob.*, vol. 16, pp. 1195-1208, 2000.

Soumekh, M. et al., "3D wavefront image formation for NIITEK GPR," *Radar Sensor Technology XIII Proc. SPIE*, vol. 7308, pp. 73080J-1-73080J-12, 2009.

Throckmorton, C. et al., "The efficacy of human observation for discrimination and feature identification of targets measured by the NIITEK ground penetrating radar," *Detection and Remediation Technologies for Mines and Minelike Targets IX, Proc. SPIE*, vol. 5415, pp. 963-972, 2004.

Torrione, P.A. et al., "Performance of an adaptive feature-based processor for a wideband ground penetrating radar system," *IEEE Trans. Aerospace Elec. Systems*, pp. 1-10, 2006.

Torrione, P.A. and L.M. Collins, "Texture features for antitank landmine detection using ground penetrating radar," *IEEE Trans. Geos. Rem. Sens.*, vol. 45, No. 7, pp. 2374-2382, 2007.

Torrione, P.A. et al., "Constrained filter optimization for subsurface landmine detection," *Detection and Remediation Technologies for Mines and Minelike Targets XI, Proc. SPIE*, vol. 6217, pp. 621710X-1-621710X-12, 2006.

Torrione, P.A., Collins, L. et al., "Application of the LMS algorithm to anomaly detection using the Wichmann/NIITEK ground penetrating radar," *Detection and Remediation Technologies for Mines and Minelike Targets VIII, Proc. SPIE*, vol. 5089, pp. 1127-1136, 2003.

Tortel, H. et al., "Decomposition of the time reversal operator for electromagnetic scattering," *J. Electromag. Waves. App.*, vol. 13, pp. 687-719, 1999.

Tsai, W-H and K-S Fu, Error-Correcting Isomorphisms of Attributed Relational Graphs for Pattern Analysis, *IEEE Transactions on Systems, Man, and Cybernetics*, vol. 9, No. 12, pp. 757-768, 1979.

Vitebskiy, S., Carin, L., "Resonances of perfectly conducting wires and bodies of revolution buried in a lossy dispersive half-space," *IEEE Trans. Ant. Prop.*, vol. 44, No. 12, pp. 1575-1583, 1996.

Vitebskiy, S. et al., "Short-pulse plane-wave scattering from buried perfectly conducting bodies of revolution," *IEEE Trans. Ant. Prop.*, vol. 44, No. 2, pp. 143-151, 1996.

Wilson, J.N. et al., "A large-scale systematic evaluation of algorithms using ground-penetrating radar for landmine detection and discrimination," *IEEE Trans. Geos. Rem. Sens.*, vol. 45, No. 8, pp. 2560-2572, 2007.

Yavuz, M.E. and F.L. Teixeira, "Full time-domain DORT for ultrawideband electromagnetic fields in dispersive, random inhomogeneous media," *IEEE Trans. Ant. Prop.*, vol. 54, No. 8, pp. 2305-2315, 2006.

Yavuz, M.E. and F.L. Teixeira, "On the sensitivity of time-reversal imaging techniques to model perturbations," IEEE Trans. Ant. Prop., vol. 56, No. 3, pp. 834-843, 2008.

Yavuz, M.E. and F.L. Teixeira, "Space-frequency ultrawideband time-reversal imaging," *IEEE Trans. Geos. Rem. Sens.*, vol. 46, No. 4, pp. 1115-1124, 2008.

Zhu, Q. and L.M. Collins, "Application of feature extraction methods for landmine detection using the Wichmann/NIITEK ground-penetrating radar," *IEEE Trans. Geos. Rem. Sens.*, vol. 43, No. 1, pp. 81-85, 2005.

Zhuge, X. et al., "UWB array-based radar imaging using modified Kirchhoff migration," *Proc. 2008 IEEE Conf. Ultra-Wideband*, vol. 3, pp. 175-178, 2008.

* cited by examiner

US 8,681,036 B2

DISTRIBUTED ROAD ASSESSMENT SYSTEM

CROSS-REFERENCE TO RELATED APPLICATION(S)

This application claims the benefit of U.S. Provisional Patent Application No. 61/377,319, filed Aug. 26, 2010, entitled "COMPUTATIONAL SYSTEM FOR DETECTING BURIED OBJECTS IN SUBSURFACE TOMOGRAPHY IMAGES RECONSTRUCTED FROM MULTISTATIC ULTRA WIDEBAND GROUND PENETRATING RADAR DATA," and U.S. Provisional Patent Application No. 61/377,324, filed Aug. 26, 2010, entitled "DART-BASED THREAT ASSESSMENT FOR BURIED OBJECTS DETECTED WITH A GROUND PENETRATING RADAR OVER TIME," which are incorporated herein by reference in their entirety.

This application is related to U.S. patent application No. 13/216,410, filed Aug. 26, 2011, entitled "REAL-TIME SYSTEM FOR IMAGING AND OBJECT DETECTION WITH A MULTISTATIC GPR ARRAY," U.S. patent application Ser. No. 13/219,425, filed Aug. 26, 2011, entitled "ATTRIBUTE AND TOPOLOGY BASED CHANGE DETECTION IN A CONSTELLATION OF PREVIOUSLY DETECTED OBJECTS," and U.S. patent application Ser. No. 13/219,435, filed Aug. 26, 2011, entitled "CLASSIFICATION OF SUBSURFACE OBJECTS USING SINGULAR VALUES DERIVED FROM SIGNAL FRAMES," which are incorporated herein by reference in their entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Paved structures (e.g., asphalt and concrete) that vehicles travel over, such as bridge decks, roadways, parking structures, runways, taxiways, and so on, deteriorate over time. The deterioration of these paved structures may be caused by usage, environmental, and aging factors, resulting in damage to the surface of the road, to rebar within pavement, to pilings supporting the road, and so on. One usage factor is vehicle weight. As the weight of a vehicle increases, the road damage (e.g., buckling and cracking) increases due to the increased stress on the road. Other usage factors include use of chains or studded tires. One environmental factor is temperature. During winter, water that seeps under a road may freeze and expand, causing road damage (e.g., potholes). Other environmental factors include earthquakes, snow, rain, and so on.

Regardless of how a paved structure is damaged, a damaged paved structure may present a danger to vehicles and their passengers that travel over the damaged portions of the paved structure. In addition, the damage may also present a danger to pedestrians, other vehicles, houses, and so on that happen to be nearby when a vehicle travels over a damaged portion. To minimize this danger, the paved structures may be periodically inspected. For example, a civil engineering firm may check paved structures on a regular basis (e.g., yearly) for the presence of new damage (e.g., cracks). Current inspection techniques include visual inspection augmented by chain dragging or hammering to detect changes in sound reverberations. These inspection techniques result in subjective, highly variable, and highly unreliable assessments, while also requiring that traffic be rerouted during the evaluation process.

It has been suggested that damage to paved structures be detected using ground-penetrating radar ("GPR"). However, each time the paved structure, roadway, or area is scanned, large amounts of data may be collected and processed. For example, the scan of a road may collect GPR return signals every few centimeters. A GPR system may generate image frames from the return signals and attempt to detect surface and subsurface damage from those image frames. Because GPR systems and their analysis techniques are typically expensive and computationally intensive, any possible road damage assessment by such techniques would likely be limited to only certain roads (e.g., bridge decks) and/or performed only on an infrequent basis. Such limited and infrequent road damage assessment fails to detect many types of road damage that may cause a serious safety hazard.

SUMMARY

A system for inspecting roads is provided. The system comprises a road assessment pod and a road assessment server. The road assessment pod is capable of being coupled to a vehicle and includes a collection of antennas for emitting ground-penetrating radar and receiving return signals as the vehicle travels down a road; a damage assessment component that analyzes the return signals to detect occurrences of damage and that determines the type of each occurrence of damage; and a transmission component that, for each occurrence of damage, transmits occurrence information that includes location and type of the occurrences. The road assessment server includes a component that receives the occurrence information transmitted by the road assessment pod; a correspondence component that identifies correspondences between newly detected occurrences and previously detected occurrences; a component that, when no correspondence is identified between a newly detected occurrence and any previously detected occurrence, indicates that the newly detected occurrence represents damage not previously detected; and a component that, when a correspondence is identified between a newly detected occurrence and a previously detected occurrence, updates information for that previously detected occurrence based on that newly detected occurrence. The system may also be wherein the correspondence component identifies a root correspondence between a newly detected occurrence and a previously detected occurrence and then identifies correspondences between other newly detected occurrences and previously detected occurrences based on that root correspondence. The system may also be wherein the correspondence component identifies correspondences between other newly detected occurrences and previously detected occurrences further based on locations of the occurrences relative to the root correspondence. The system may also be wherein the correspondence component identifies correspondences between other newly detected occurrences and previously detected occurrences further based on types of the occurrences. The system may also be wherein the road assessment server includes a component that provides a user interface for receiving from a user a query relating to road damage and for displaying a map indicating locations of road damage. The system may also be wherein the damage assessment component includes a detection component that detects objects from the return signals and a classification component that classifies the detected objects as representing road damage or not representing road damage. The system may also be wherein the road assessment server receives transmitted occurrence information from a plurality of road assessment pods. The system may also be wherein the road assessment server includes a component that provides instructions to the road assessment pod indicating a road that the road assessment pod is to inspect for damage.

A road assessment pod for collecting road damage information as a vehicle travels down a road is provided. The road assessment pod comprises a collection of antennas for emitting ground-penetrating radar and receiving return signals as the vehicle travels down a road; a detection component that analyzes the return signals to detect objects on or below the surface of the road; a classification component that determines whether a detected object represents an occurrence of road damage; a type component that determines a type of each occurrence of damage; and a transmission component that, for each occurrence of damage, transmits occurrence information that includes location and type of the occurrence. The road assessment pod may also be wherein the collection of antennas includes transceivers that operate in multistatic mode. The road assessment pod may also be claim 9 including a navigation component that determines current location of the road assessment pod. The road assessment pod may also be wherein power for the road assessment pod is provided by the vehicle on which it is mounted. The road assessment pod may also include a component that transmits images generated by the detection component to a road assessment server. The road assessment pod may also be wherein the road damage information is collected as the vehicle travels at highway speeds.

A road assessment system for collecting road damage information from road assessment pods as vehicles on which the road assessment pods are mounted travel down a road is provided. The road assessment system comprises a component that receives occurrence information transmitted by road assessment pods, the occurrence information indicating newly detected occurrences of damage to the road; a correspondence component that identifies correspondences between newly detected occurrences and previously detected occurrences; a component that, when no correspondence is identified between a newly detected occurrence and any previously detected occurrence, indicates that the newly detected occurrence represents damage not previously detected; and a component that, when a correspondence is identified between a newly detected occurrence and a previously detected occurrence, updates information for that previously detected occurrence based on that newly detected occurrence. The road assessment system may also be wherein the correspondence component identifies a root correspondence between a newly detected occurrence and a previously detected occurrence and then identifies correspondences between other newly detected occurrences and previously detected occurrences based on that root correspondence. The road assessment system may also be wherein the correspondence component identifies correspondences between other newly detected occurrences and previously detected occurrences further based on locations of the occurrences relative to the root correspondence. The road assessment system may also be wherein the correspondence component identifies correspondences between other newly detected occurrences and previously detected occurrences further based on types of the occurrences. The road assessment system may also include a component that provides a user interface for receiving from a user a query relating to road damage and for displaying a map indicating locations of road damage.

A method for inspecting roads is provided. The method comprises collecting by a road assessment pod road damage information as a vehicle on which the road assessment pod is mounted travels down a road, the road assessment pod using ground-penetrating radar to identify occurrences of damage to the road; transmitting by the road assessment pod occurrence information in real time to a road assessment server, the occurrence information including location and type of each occurrence of damage identified by the road assessment pod; and processing by the road assessment server the occurrence information to identify new occurrences of damage and changes to existing occurrences of damage based on the locations of newly detected occurrences of damage compared to locations of previously detected occurrences of damage.

DETAILED DESCRIPTION

Figure 1A:
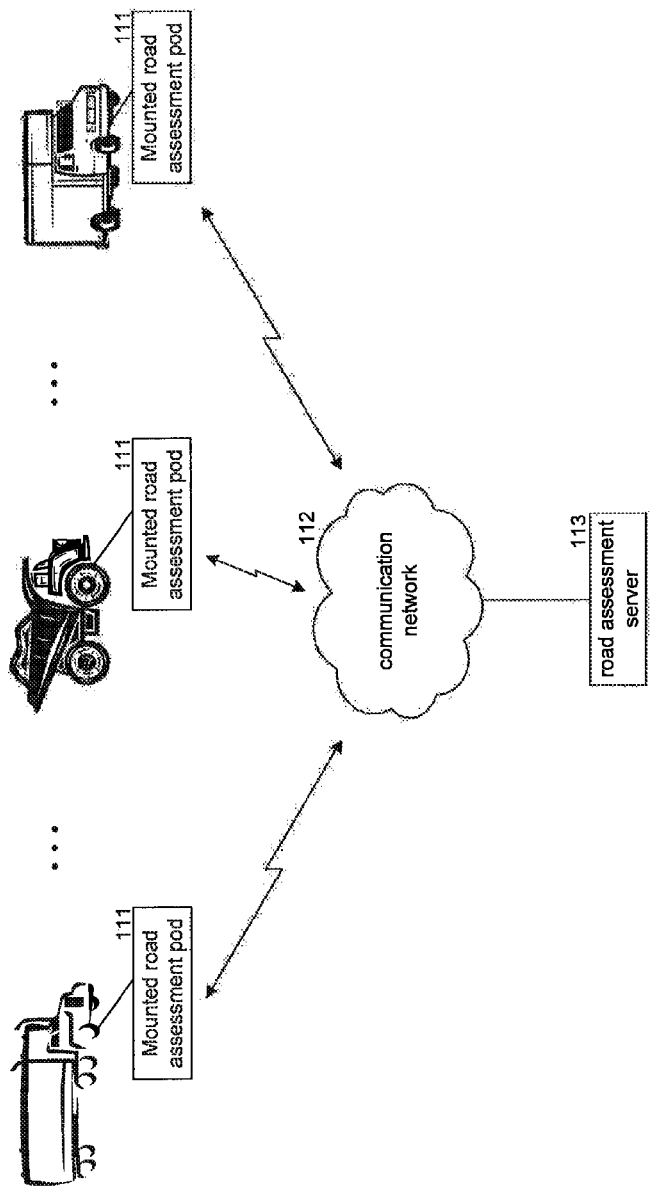
FIG. 1A is a diagram that illustrates components of a distributed road assessment system in some embodiments.

A method and system is provided that detects damage on or below the surface of a paved structure or pavement. These can include but are not limited to road surfaces, bridge decks, parking structures, airport runways, taxiways, utility conduits, and so on, which are generally referred to as "roads." In some embodiments, a distributed road assessment system includes road assessment pods and a road assessment server. Each road assessment pod includes a ground-penetrating radar antenna array and a detection system that detects road damage from the return signals as the vehicle on which the pod is mounted travels down a road. Each road assessment pod transmits to the road assessment server occurrence information describing each occurrence of road damage that is newly detected on a current scan of a road (i.e., as the vehicle travels down the road). For example, a road assessment pod may transmit the type (e.g., pothole), location, severity, orientation, size, and so on of each newly detected occurrence of road damage. The road assessment server maintains a road damage database of occurrence information describing the previously detected occurrences of road damage (e.g., detected by a road assessment pod on a previous scan of a road). After the road assessment server receives occurrence information for newly detected occurrences of road damage for a portion of a road, the road assessment server determines which newly detected occurrences correspond to which previously detected occurrences of road damage. When the road assessment server determines that a newly detected occurrence corresponds to a previously detected occurrence, it updates its database to reflect the new occurrence information received from a road assessment pod. For example, the new occurrence information may indicate that the severity of the road damage has increased or decreased since the last scan. If the severity has decreased, then the damage may have been repaired or either the new scan or the previous scan may have been somewhat inaccurate. When the road assessment server determines that a newly detected occurrence does not correspond to a previously detected occurrence, it adds the occurrence information for the newly detected occurrence to its road damage database. The road assessment server may also provide a user interface through which a person can view and analyze the occurrence information of the road damage database. The road assessment server may also interface with a geographic information system ("GIS") to provide maps that graphically illustrate the locations of roads along with the occurrences of damage along the roads.

In some embodiments, the road assessment pods may be mounted on fleets of vehicles such as government-owned vehicles, postal service vehicles, express delivery vehicles, trucking company vehicles (e.g., "big rigs"), and so on. The road assessment pods inspect the roads that the vehicles travel over at highway speeds so that the roads can be inspected as the vehicles travel over the roads during their normal course of business. For example, a road assessment pod mounted on a big rig may inspect a highway as the rig travels to its next location for pickup or delivery of a bad. In some cases, the owners of the vehicles may be compensated for allowing road assessment pods to be mounted on their vehicles. The road assessment pods may have a few standard configurations for use by vehicles of different types. The standard configurations may include a standard array of antennas, a standard detection system, an object classification component, a standard navigation system (including a global positioning system ("GPS") receiver, and a data transmission system. A road assessment pod may include its own power supply or may tap into the power of the vehicle to which it is mounted. The standard configurations may include a few different mounting options to accommodate different types of vehicles (e.g., a car or a truck). When standard configurations are used, the cost of production of the road assessment pods will likely be lowered. With a lower cost, the road assessment pods can be mounted on vehicles at a relatively low per-vehicle cost, and road damage information can be collected at an increased frequency and over a wide area. When the road damage information is collected more frequently, safety problems caused by newly detected damage or previously detected damage that is rapidly deteriorating damage can be minimized by taking early preventive measures. The detection system of a road assessment pod may detect objects within a scan using conventional detection techniques. In some embodiments, the objects are detected using the imaging and detection system described in U.S. patent application Ser. No. 13/219,410, entitled "REAL-TIME SYSTEM FOR IMAGING AND OBJECT DETECTION WITH A MULTISTATIC GPR ARRAY," which is being filed concurrently and is hereby incorporated by reference. After the detection system detects an object, the object classification component analyzes the object to determine whether the object represents road damage or some other type of surface or subsurface object. For example, the object classification component may differentiate pavement seams from cracks and speed bumps from buckling. In some embodiments, the objects are classified using the classification system described in U.S. patent application Ser. No. 13/219,435, entitled "CLASSIFICATION OF SUBSURFACE OBJECTS USING SINGULAR VALUES DERIVED FROM SIGNAL FRAMES," which is being filed concurrently and is hereby incorporated by reference. The transmission system of the road assessment pod may transmit to the road assessment server the occurrence information for newly detected occurrences at a set frequency (e.g., once every 5 minutes), after a certain number of occurrences have been detected, and so on. The transmission system may transmit the occurrence information using various types of communication networks such as a cellular network, a satellite network, a wireless wide area network, and so on. When a road assessment pod includes a detection system that detects objects from the return signals, the pod can avoid having to transmit the streaming imaging data to the road assessment server and instead only transmit the road damage properties or attributes. The amount of occurrence information that may be sent from a road assessment pod to the road assessment server is thus very small compared to the amount of imaging data from which the occurrence information is derived.

In some embodiments, the road assessment server captures properties or characteristics of previously detected occurrences, such as location, severity of damage, time of detection, size, elongation, orientation, etc. The topology of the network of previously detected occurrences (the geometrical structure of the network in xyz space) is maintained in the road damage database, which stores attributes of previously detected occurrences and implicitly captures the geometrical structure of the network. The road assessment server detects changes in road damage (i.e., new damage or existing damage that has changed) by comparing the attributes and topology of new occurrences detected on the latest scan to the road damage database of previously detected occurrences. The road damage database includes values of attributes for specific occurrences of damage that are aggregated from previous scans. When the road assessment server receives information on newly detected occurrences for the latest scan, it evaluates how well the newly detected occurrences correspond to previously detected objects topologically and possibly in terms of attributes. The road assessment server initially selects a previously detected occurrence that appears to correspond to a newly detected occurrence (in the sense that they topologically appear to be the same occurrence of damage) using a spatial network correspondence algorithm. Such a topological correspondence is referred to as the "root correspondence." The road assessment server evaluates the degree of correspondence between other newly detected occurrences and other previously detected occurrences in the vicinity based on this root correspondence. The root correspondence algorithm may, for example, select a previously detected occurrence and a newly detected occurrence that are topologically consistent and have similar attributes. Once the road assessment server selects a pair of newly and previously detected occurrences as the root correspondence, it calculates a "cost" associated with pairs of other newly and previously detected occurrences. This cost reflects the belief that the newly detected object of the non-root pair corresponds to the previously detected occurrences of that pair. For example, a low cost may indicate that the occurrences more likely correspond. The road assessment server may then generate a change index for each newly detected occurrence to quantify the belief that it might not have been previously detected (and thus constitute a change). For example, a high change index may indicate that the newly detected occurrence of damage is more likely to have never been detected on any previous scan. The change detection system may set the change index for a newly detected occurrence to be the cost of assigning that occurrence to the previously detected occurrence that it best corresponds with based on both attributes and topological consistency. The change detection system may determine a likely correspondence between previously and newly detected occurrences using a standard minimal cost assignment algorithm applied to spatially localized sets of previous and newly detected occurrences. After determining the optimal correspondence, the road assessment server updates information in the road damage database of previously detected occurrences with the values of the attributes of the corresponding newly detected occurrences, as these attributes may vary over time due to variations in scan path (e.g., direction of travel or closeness to the center of the roadway), changes in the surface (e.g., ruts in the roadway after a rainstorm), and so on. If a newly detected occurrence corresponds to no previously detected occurrence, then it may constitute a change. If so, the road assessment server adds that occurrence as an additional occurrence to the road damage database, and it will be treated as a previously detected occurrence by subsequent scans.

FIG. 1A is a diagram that illustrates components of a distributed road assessment system in some embodiments. The distributed road assessment system 110 may have a fleet of vehicles 111 with a road assessment pod mounted on each vehicle. Each road assessment pod communicates with a road assessment server 113 via a communication network 112. As a vehicle travels down a road, the antenna array of the road assessment pod emits radar signals and acquires the return signals. A detection system of the road assessment pod detects surface and subsurface objects by analyzing the return signals. An object classification component of the road assessment pod classifies the objects as representing road damage or not road damage. A transmission system of the road assessment pod then transmits to the road assessment server via the communication network occurrence information describing the objects classified as road damage, which are newly detected occurrences of road damage. The road assessment server determines whether a newly detected occurrence of damage corresponds to a previously detected occurrence. If the newly detected occurrence corresponds to a previously detected occurrence, the road assessment server updates the information in the road damage database for that previously detected occurrence to reflect the additional information of the newly detected occurrence. If the newly detected occurrence does not correspond to any previously detected occurrence, the road assessment server adds the occurrence information for the newly detected occurrence to the road damage database. The road assessment server may also provide instructions to the road assessment pod indicating when and where the pod should scan for road damage. For example, the road assessment server may have a plan indicating the frequency at which each portion of a road should be scanned. (The frequency may be variable depending on road conditions, traffic, weather, and so on.) When a road assessment pod is nearing or plans to be near a portion of a road that should be scanned, the road assessment server may transmit instructions to the pod to start scanning at a certain portion of a road.

In some embodiments, a road assessment pod employs a linear array of transmitter and receiver antennas for transmitting and receiving radar signals. For example, the linear array may consist of 16 transmitters $T_i$ and 16 receivers $R_j$ with each transmitter $T_k$ and receiver $R_k$ organized into a transceiver pair. The transceivers are equally spaced across the linear array.

Figure 1B:
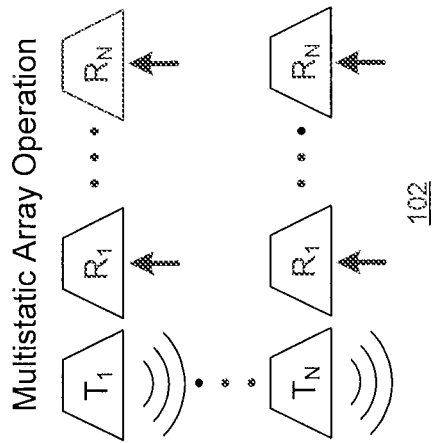
FIG. 1B is a diagram that illustrates an arrangement of a linear array of antennas.
Figure 1B:
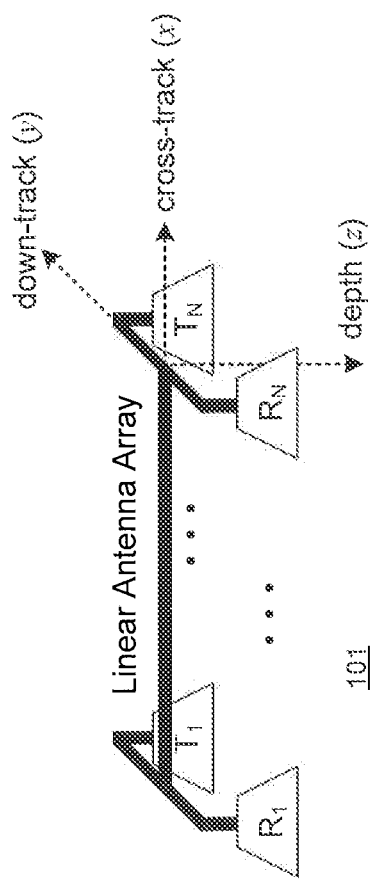

FIG. 1B is a diagram that illustrates an arrangement of a linear array of antennas. The linear array is mounted on a vehicle that is driven on a road to detect objects and in particular objects representing road damage. The linear array moves in a down-track (or y) direction relative to the surface of the road, the linear array is oriented in a cross-track (or x) direction, and the linear array transmits signals in the depth (or z) direction. The down-track is the direction of travel, the cross-track is the direction across the road, and the depth is the direction into the road. As shown in the linear array 101, the transmitter and receiver $T_iR_i$ associated with a given transceiver pair are located at substantially the same cross-track location. The linear array has two modes of operation: multi-monostatic and multistatic. In monostatic mode, the signal transmitted by a transmitter is received only by the receiver of that same transceiver. The multi-monostatic mode refers to the operation of multiple transceivers of a linear array that each operate in the monostatic mode in sequence. When in multi-monostatic mode, at each down-track or sampling location, the detection system activates the transmitters of each transceiver in sequence across the track and collects the return signal only at the corresponding receiver of that transceiver. The detection system thus collects one return signal for each transceiver at each down-track location. The multistatic mode refers to the operation of multiple transceivers of a linear array in which each transmitter transmits in sequence, but the return signal is collected by multiple receivers, generally all the receivers. When in multistatic mode, at each down-track location, the detection system activates the transmitter of each transceiver in sequence and collects the return signal from all the receivers, as illustrated in diagram 102. If the linear array has N transceivers, then the detection system collects N return signals in multi-monostatic mode and $N^2$ return signals in multistatic mode. In some embodiments, the array of transceivers may not be linear or may be organized into a grid of transceivers.

Figure 1C:
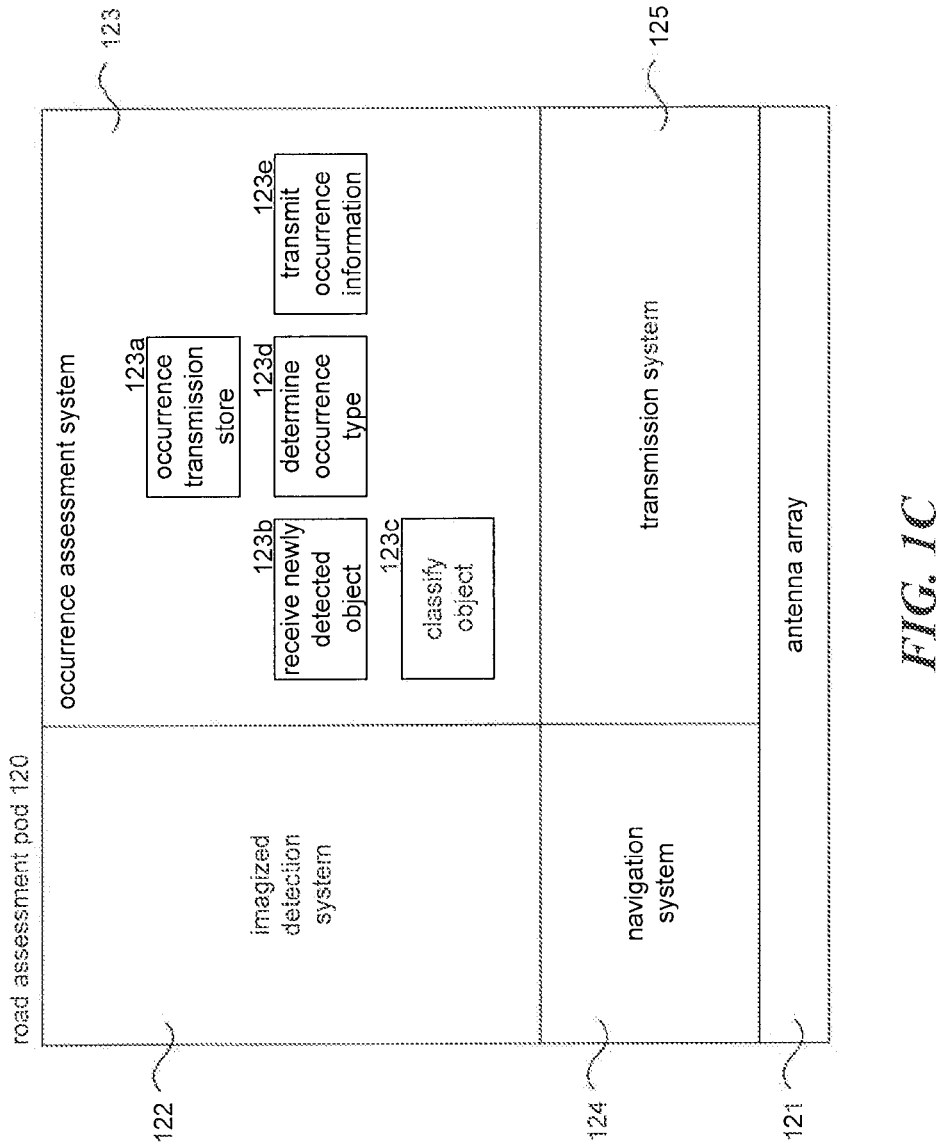
FIG. 1C is a block diagram illustrating components of a road assessment pod in some embodiments.

FIG. 1C is a block diagram illustrating components of a road assessment pod in some embodiments. A road assessment pod 120 includes an antenna array 121, an imaging and detection system 122, an occurrence assessment system 123, a navigation system 124, and a transmission system 125. The antenna array and the imaging and detection system operate to identify surface and subsurface objects as the pod travels down a road. The occurrence assessment system Includes an occurrence transmission store 123a, a "receive newly detected object" component 123b, a "classify object" component 123c, a "determine occurrence type" component 123d, and a "transmit occurrence information" component 123e. The occurrence transmission store stores occurrence information for newly detected occurrences pending transmission to the road assessment server. The "receive newly detected object" component receives an indication of a newly detected object from the imaging and detection system and invokes the "classify object" component and the "determine occurrence type" component to classify the object and, if the object is classified as road damage, to determine the type of road damage. The "transmit occurrence information" component transmits the occurrence information from the occurrence transmission store to the road assessment server using the transmission system. The transmission system provides the interface to the communication network. For example, a transmission system may include a cellular radio, a satellite link, and so on.

Figure 1D:
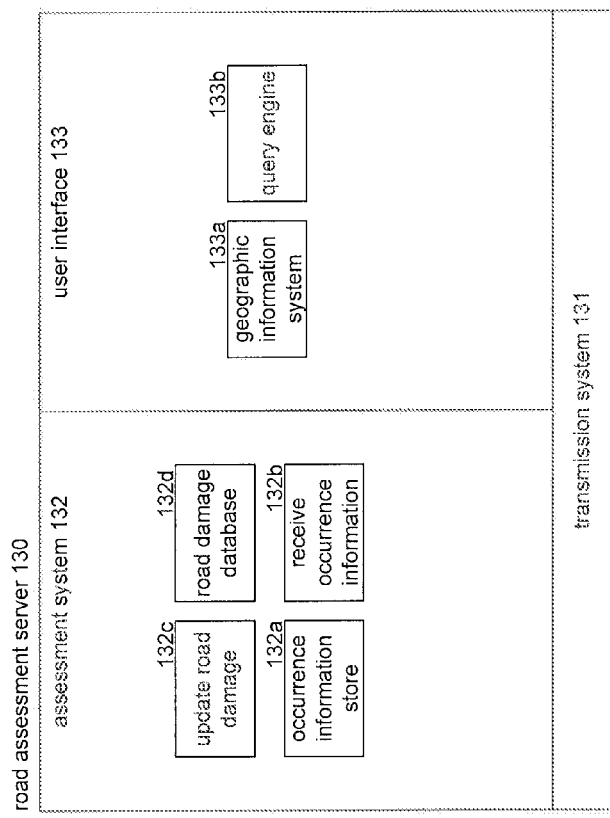
FIG. 1D is a diagram that illustrates components of the road assessment server in some embodiments.

FIG. 1D is a diagram that illustrates components of the road assessment server in some embodiments. The road assessment server 130 includes a transmission system 131, an assessment system 132, and a user interface 133. The transmission system provides the interface to the communication network. The assessment system includes an occurrence information store 132a, a "receive occurrence information" component 132b, an "update road damage" component 132c, and a road damage database 132d. The "receive occurrence information" component receives occurrence information from the transmission system and stores the occurrence information in the occurrence information store. The "update road damage" component processes the occurrence information in the occurrence information store to update the road damage database. The user interface includes a graphical information system 133a (or interface to such a system) and a query engine 133b. The user interface allows a user to query the road damage database and to display the queried information in a graphical form. The road assessment server may also have an application programming interface ("API") through which application programs can access the road damage database to perform custom analysis of the road damage information.

In some embodiments, the road assessment server identifies the root correspondence for previously and newly detected occurrences by calculating a mapping efficiency for previously detected occurrence and newly detected occurrence pairs. Mapping efficiency reflects the degree of topological match between previously detected occurrences and newly detected occurrences within a localized area given a presumption of root correspondence between a specific previously detected occurrence and a specific newly detected occurrence within that same area. The road assessment server establishes the root correspondence as that pair of previously and newly detected occurrences for which the associated mapping efficiency is maximized.

Figure 1E:
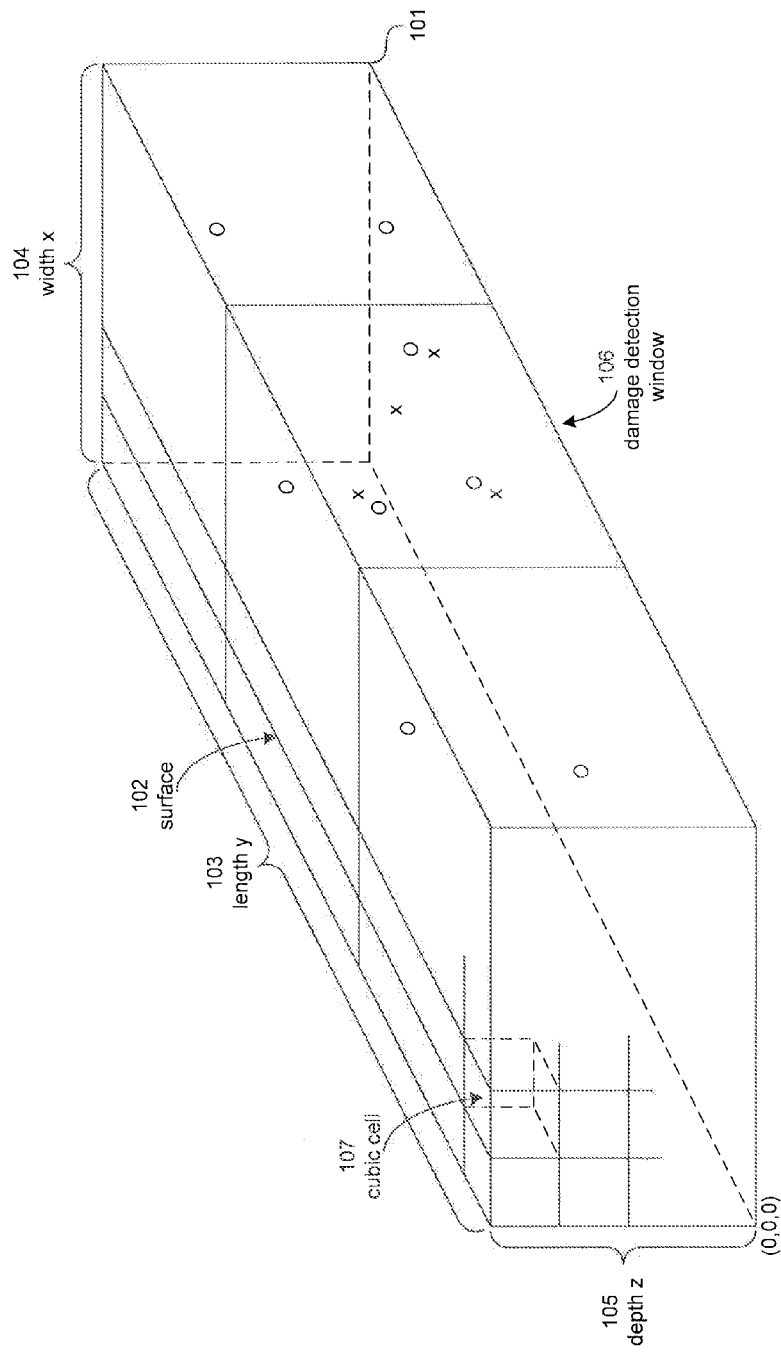
FIG. 1E is a diagram that illustrates conceptually a scan.

FIG. 1E is a diagram that illustrates conceptually a scan. A subsurface 101 includes a surface 102 with a length 103, a width 104, and a depth 105. For example, the length may be 20 kilometers, the width may be 5 meters, and the depth may be 1 meter. The road assessment server may perform processing to extract newly detected occurrences and update the road damage database within a damage detection window 106 that covers the localized neighborhood extending prior to and ahead of the current location along the pavement every time another occurrence of damage is detected. The damage detection window is a volume that extends for a prescribed window length (e.g., 100 meters) for the width and the depth. FIG. 1E represents the previously detected occurrences as O's and the newly detected occurrences as X's. To calculate the mapping efficiencies for potential root correspondences (for all possible pairs of an O and an X in the damage detection window), the road assessment server considers the subsurface to be divided into cubic cells 107 in xyz space. To speed up the calculation of the mapping efficiency, the road assessment server may maintain a data structure indicating the cubic cells that contain a previously detected occurrence. The road assessment server may use a binary flag (e.g., 0 or 1) to indicate the absence or presence of a previously detected occurrence within a cubic cell. The road assessment server regards each pair of previously and newly detected occurrences as a potential root correspondence. For a candidate newly detected root correspondence occurrence, the road assessment server computes a vector in xyz, space from that newly detected occurrence to each of the remaining newly detected occurrences in the neighborhood. It then determines the endpoints of such vectors emanating from the location of the candidate previously detected occurrence in the root correspondence pair, and counts the number of cells of value 1 that contain the endpoints of those vectors. The mapping efficiency is then the number of such 1s divided by the number of vectors that were considered, and it varies from 0 to 1. The road assessment server designates the pair of previously and newly detected occurrences with the largest mapping efficiency as the root correspondence. The road assessment server may use grid cells other than cubes. For example, the grid cells may have a different width, length, and depth. Also, the width, length, and depth of the grid cell need not be constant. For example, depths of the grid cells may be less toward the surface to reflect a higher confidence in the location of detected occurrences that are nearer to the surface.

In some embodiments, the road assessment server generates a cost matrix with one row for each newly detected occurrence in the vicinity of the newly detected occurrence in the root pair and one column for each previously detected occurrence in that same vicinity (excluding the previously detected occurrence in the root pair). For each entry in the cost matrix, the road assessment server generates a cost (or score) reflecting the belief that the newly detected occurrence associated with that entry does not correspond to the previously detected occurrence associated with that entry, given the root correspondence established as described above. The road assessment server calculates the cost for each such pair based on (i) detection fitness for occurrences in that pair and (ii) topological consistency between those occurrences. The fitness of a detection is a measure of the goodness or strength of an occurrence detection, and it varies from 0 to 1. Topological consistency also varies from 0 to 1, and it reflects the degree of consistency between attributes of the previously and newly detected occurrences in the pair. These attributes are referred to as edge attributes, and they may include the orientation of an occurrence relative to its root, the pointing vector from the root to the occurrence, the orientation angles of the occurrence and its root relative to the pointing vector from the centroid of the root to the centroid of the occurrence, and so on. The edge attributes are derived from the attributes of the occurrences (vertices) that they connect, where the vertex attributes include occurrence location, time of detection, orientation, length, width, elongation, etc. In some embodiments, the road assessment server may only use location when determining topological consistency. In some embodiments, the topological consistency between a pair of previously and newly detected occurrences is computed by evaluating the likelihood of the attributes of the edge that connects the previously detected occurrence to its root relative to the attributes of the edge that connects the newly detected occurrence to its root. The joint likelihood of edge attributes is modeled as the product of marginal likelihood functions of one variable for each of the edge attributes. The road assessment server provides a marginal likelihood function for each edge attribute that takes the value of the corresponding attribute for the edge that connects the newly detected occurrence to its root as the mode or peak location. The variance of each marginal likelihood function may be specific to each edge attribute, and it reflects the degree of uncertainty in attribute values captured by a distributional attributed relational tree as described below in detail. The road assessment server then determines the minimal cost assignment (one-to-one mapping) of newly detected occurrences to previously detected occurrences from the cost matrix.

In some embodiments, after generating a cost matrix, the road assessment server updates the road damage database to reflect the newly detected occurrences. The road assessment server may apply a minimal cost algorithm to identify the correspondence between previously and newly detected occurrences that represents the most likely correspondence. One suitable minimal cost assignment algorithm is described in Orlin, J. B. and Ahuja, R. K., "New Scaling Algorithms for the Assignment and Minimum Cycle Mean Problems," Mathematical Programming, Vol. 54, 1992, pp. 41-56, which is hereby incorporated by reference. After identifying the most likely correspondence between the previously and newly detected occurrences, the road assessment server updates the road damage database for the previously detected occurrences to reflect the attributes of the corresponding newly detected occurrences. If a newly detected occurrence does not have a corresponding previously detected occurrence, then the road assessment server adds that newly detected occurrence to the road damage database.

Figure 2:
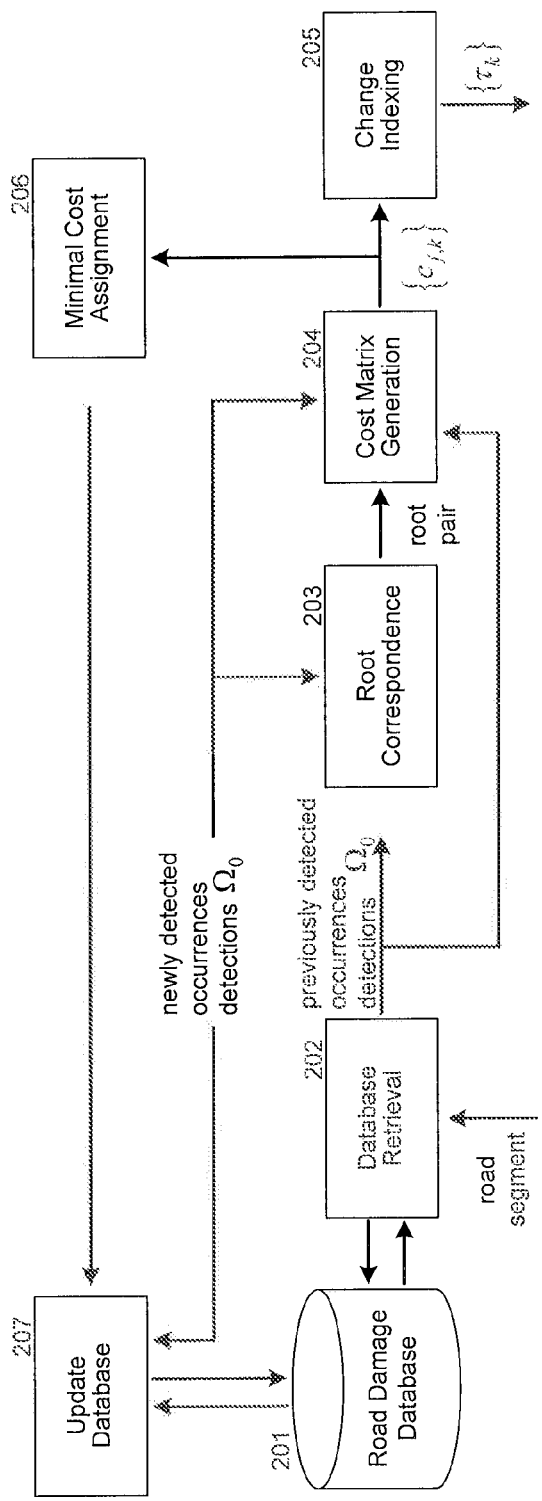
FIG. 2 is a block diagram that illustrates the overall flow of the road assessment server in some embodiments.

FIG. 2 is a block diagram that illustrates the overall flow of the road assessment server in some embodiments. A road damage database 201 contains the previously detected occurrences. A "database retrieval" component 202 retrieves previously detected occurrences from the road damage database, accepts newly detected occurrences detected by the detection system of a road assessment pod on the latest scan, and saves them as new occurrences. A "root correspondence" component 203 identifies a specific pair of previously and newly detected occurrences as the root correspondence for the purpose of generating the cost matrix. A "cost matrix generation" component 204 generates the cost matrix. A "change indexing" component 205 generates the change indices for the newly detected occurrences from the cost matrix. A "minimal cost assignment" component 206 identifies the most likely correspondence between previously and newly detected occurrences. An "update database" component 207 updates the road damage database based on the established correspondence between the previously and newly detected occurrences.

Figure 3:
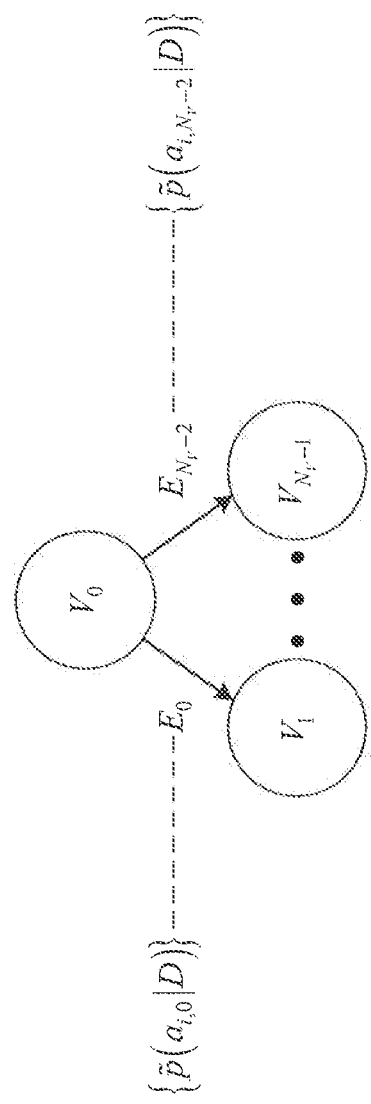
FIG. 3 illustrates a relational tree with $N_V$ vertices and $N_E=N_V-1$ edges.

In some embodiments, the road assessment server represents the newly detected occurrences as vertices in an attributed relational tree ("ART"). An ART is an attributed graph G with a bi-level tree topology. FIG. 3 illustrates a relational tree with $N_V$ vertices (one root $V_0$ plus $N_V-1$ leaves $\{V_i\}_{i=1}^{N_V-1}$) and $N_E=N_V-1$ edges $\{E_k\}_{k=0}^{N_E-1}$ ($E_k$ connects $V_0$ to $V_{k+1}$). The road assessment server uses a relational tree to represent a localized network of newly detected occurrences detected on the latest scan. The ART ontology defines admissible entity types for vertices (e.g., the type of occurrence detected) and the attributes of its vertices and edges. Examples of attributes for the vertices and edges are represented in Table 1.

TABLE 1

| Vertex Attributes $A_j$ | |
|---|---|
| s | fitness of the detection $\in [0, 1]$ |
| (x, y, z) | xyz location |
| $(t_0, t_1)$ | time (first, last) detected |
| $\theta$ | long axis angle in xy $\in (-\pi/2, \pi/2)$ |
| L, w | Length, width $\geq 0$ |
| $\lambda = L/w$ | elongation 0 or $\geq 1$ |
| Edge Attributes $a_j$ | |
| $(\Delta_x, \Delta_y, \Delta_z)$ | edge pointing vector |
| $\Delta_t$ | $(t_1)_{leaf} - (t_1)_{root}$ |
| $\alpha$ | angle from the long axis of the root occurrence to the edge vector from the root occurrence and this leaf occurrence $\in (-\pi/2, \pi/2)$ |
| $\beta$ | angle from the long axis of this leaf occurrence to the edge vector from the root occurrence and this leaf occurrence $\in (-\pi/2, \pi/2)$ |
| $\gamma$ | angle from the vector of edge 0 in the DART to the edge vector from the root occurrence of this leaf occurrence $\in (-\pi, \pi)$ |
| $\delta$ | angle from the long axis of the leaf occurrence to the long axis of the root occurrence $\in (-\pi/2, \pi/2)$ |

The road assessment server may use a distributional ART or DART D, which is a stochastic attributed relational tree model whose edge attributes $\{a_{i,k} i=0 \ldots n_a-1, k=0 \ldots N_E-1\}$ are replaced by marginal densities (likelihood functions) p $(a_{i,k}|D)$ that impose probabilistic uncertainty on the edge attribute values (FIG. 3). The road assessment server may model these likelihoods as symmetric functions in one dimension (e.g., with a rectangular, triangular, or clipped Gaussian pulse shape). The road assessment server considers the attributes to be statistically independent. Thus, the joint likelihood $p_k(a|D)$ for edge $E_k$ is expressed as the product of marginal likelihoods $p(a_{i,k}|D)$ $i=0 \ldots n_a-1$. The road assessment server uses normalized likelihoods $\tilde{p}(a_{i,k}|D)$, as shown in FIG. 3, to quantify the topological consistency between DART D and the road damage database of previously detected occurrences using the following equations:

$$\tilde{p}_k(a|D) = \prod_{i=0}^{n_a-1} \tilde{p}(a_{i,k}|D) \quad (1a)$$

$$\tilde{p}(a_{i,k}|D) \stackrel{\Delta}{=} p(a_{i,k}|D)/\max p(a_{i,k}|D) \quad (1b)$$

The road assessment server represents new occurrences within a localized area as $$\Omega_1 \stackrel{\Delta}{=} \{V_k(\Omega_1)\}_{k=0}^{m_1-1}$$

and previously detected occurrences within that same general area as $$\Omega_0 \stackrel{\Delta}{=} \{V_j(\Omega_0)\}_{j=0}^{m_0-1}.$$

The road assessment server identifies a root correspondence $[V_0(\Omega_0), V_0(\Omega_1)]$ between $\Omega_0$ and $\Omega_1$ such that vertex $V_0(\Omega_0)$ of $\Omega_0$ and vertex $V_0(\Omega_1)$ of $\Omega_1$ represent the previously and newly detected occurrence in the root correspondence. Algorithm 1 provides an algorithm for identifying a root correspondence.

Algorithm 1

```
e(i, j) = 0
for i' = 0 ... m₁ - 1    (i' ≠ i)
  a. Compute the direction vector from V_i'(Ω₁) to V_i(Ω₁):
     [Δ_x, Δ_y, Δ_z] =
     [x(V_i'(Ω₁)) - x(V_i(Ω₁)), y(V_i'(Ω₁)) - y(V_i(Ω₁)), z(V_i'(Ω₁)) - z(V_i(Ω₁))]
  b. Find the grid cell that the direction vector points to if it starts
     from V_j(Ω₀):
```

$$(i'', j'', k'') = \text{int}\left(\frac{x(V_j(\Omega_0)) + \Delta_x - x_{min}}{\varepsilon}\right), \left(\frac{y(V_j(\Omega_0)) + \Delta_y - y_{min}}{\varepsilon}\right),$$
$$\left(\frac{z(V_j(\Omega_0)) + \Delta_z - z_{min}}{\varepsilon}\right)$$

c. Increment e(i, j) if that grid cell contains an element of $\Omega_0$:
   if cell (i'', j'', k'') = 1 then e(i, j) = e(i, j) + 1

$$e(i, j) = \frac{1 + e(i, j)}{m_1} \in \left[\frac{1}{m_1}, 1\right]$$

The road assessment server establishes the root correspondence for the previously and newly detected occurrences to maximize mapping efficiency. The road assessment server may define mapping efficiency e(i,j) as the fraction of the $m_1$ vertices in $\Omega_1$ that have possible correspondences in $\Omega_0$ for the potential root correspondence $[V_j(\Omega_0)\in\Omega_0, V_i(\Omega_1)\in\Omega_1]$, and as e(i,j)=0 if $V_j(\Omega_0)\in\Omega_0$ and $V_i(\Omega_1)\in\Omega_1$ are inconsistent as to their type, orientation, and physical dimensions. The road assessment server generates a binary spatial index grid for $\Omega_0$ in xyz space (e.g., representing the area along the entire scan or along a portion of the scan). The cubic grid cells may have a width defined by their error tolerance $\varepsilon$ in relative locations of occurrences, and the grid origin may be at the minimum x, y, and z over all previously detected occurrences within $\Omega_0$. The road assessment server sets the value of the grid cell to 1 if it contains the centroid of an occurrence from $\Omega_0$. Once the road assessment server has identified a root correspondence, the root vertices may be designated as the vertices of index 0 in $\Omega_0$ and $\Omega_1$.

The road assessment server constructs a DART D by imposing uncertainty on the ART formed from $\Omega_1$ with $V_0(\Omega_1)$ as the root. The road assessment server replaces each edge attribute $a_{i,k}$ in the ART with a likelihood function $p(a_{i,k}|D)$ in DART D, where the peak and width of the likelihood function vary in accordance with the values of the attributes of the newly detected occurrences. For example, the peak of the likelihood function occurs at the value of $a_{i,k}$ from the ART, and the width of the likelihood function is specified to reflect the degree of uncertainty in the value of $a_{i,k}$.

The road assessment server transforms change detection into a minimal cost assignment problem in which newly detected occurrences captured in DART D are assigned to previously detected occurrences captured in the subset $\Omega_0$ of the road damage database. Once formulated, this minimal cost assignment problem can be solved using standard cost scaling methods. In some embodiments, the road assessment server employs a cost function c that depends on a variable u that combines fitnesses of detections associated with a corresponding pair of previously and newly detected occurrences, and a variable v that quantifies topological consistency for that pair. The variables u and v both vary from zero to one, and c(u,v) is a continuous function defined on the unit square 0≤u, v≤1, The road assessment server assumes that complete topological inconsistency (v=0) will lead to the highest possible cost (c=1) and that complete absence of fitness (u=0) will also lead to the highest possible cost (c=1) The lowest possible cost (c=0) applies only when topological consistency and detection fitness are both perfect (u=v=1). The road assessment server may further take the cost trend for perfect topological consistency (v=1) as linear and decreasing from one to zero with fitness u. These conditions lead to the following boundary conditions for cost function c:

$$c(u,0) = 1 \quad (2a)$$

$$c(u,1) = 1 - u \quad (2b)$$

The simplest continuous function from zero to one over the unit square that satisfies these boundary conditions is the bilinear DART cost function represented as follows:

$$c(u,v) = 1 - uv \quad (3)$$

The road assessment server characterizes topological matching of DART D to $\Omega_0$ as a minimal cost assignment problem. To accomplish this, it generates a cost matrix $\{c_{j,k}\}$ from the cost function c(u,v). The rows j of $\{c_{j,k}\}$ represent previously detected occurrences, and the columns k represent newly detected occurrences. The elements $c_{j,k} \in [0,1]$ reflect the cost of making the determination that previously detected occurrence j and newly detected occurrence k are really the same occurrence. The road assessment server evaluates the cost matrix by solving the minimal cost assignment problem for that cost matrix.

The cost matrix $\{c_{j,k}\}$ is an $(m_0-1)\times(m_1-1)$ matrix because the root correspondence $[V_0(\Omega_0)\in\Omega_0, V_0(\Omega_1)\in\Omega_1]$ has already been established between one pair of occurrences. The element $c_{j,k}$ thus represents the cost of mapping previous occurrence j+1 from $\Omega_0$ (expressed symbolically as $V_{j+1}(\Omega_0)$) to recent occurrence k+1 from $\Omega_1$ (i.e., leaf k+1 of DART D, expressed symbolically as $V_{k+1}(\Omega_1)$). The cost matrix elements $c_{j,k}$ may be derived from the cost function c(u,v) as follows:

$$c_{j,k} = c(u_{j,k}, v_{j,k}) \quad (4a)$$

$$u_{j,k} = \frac{s(V_{j+1}(\Omega_0)) + s(V_{k+1}(\Omega_1))}{2} \quad (4b)$$

$$v_{j,k} = \tilde{p}_k(a(V_0(\Omega_0) \to V_{j+1}(\Omega_0)) | D) \quad (4c)$$

where s(V) represents the fitness of vertex V, $V_0(\Omega_0) \to V_{j+1}(\Omega_0)$ represents the edge $E_{j+1}$ from $V_0(\Omega_0)$ to $V_{j+1}(\Omega_0)$ and $a(E_{j+1})$ represents the vector of attributes for edge $E_{j+1}$. The fitness $u_{j,k}$ in Equation 4b is the mean of fitnesses for the newly detected occurrence that corresponds to vertex $V_{k+1}$ in DART D and the previously detected occurrence that corresponds to vertex $V_{j+1}$ from $\Omega_0$. The combination of Equations 3 and 4a-c results in the following equation for cost matrix elements $c_{j,k}$:

$$c_{j,k} = 1 - \tilde{p}_k(a(V_0(\Omega_0) \to V_{j+1}(\Omega_0)) | D) \cdot \frac{s(V_{j+1}(\Omega_0)) + s(V_{k+1}(\Omega_1))}{2} \quad (5)$$

For k=0 . . . $m_1-2$, the change index $\tau_{k+1}$ quantifies the likelihood (from 0 to 1) that the newly detected occurrence represented by leaf k+1 of DART D constitutes a change relative to the road damage of previously detected occurrences. The road assessment server computes the change index $T_{k+1}$ for DART leaves as the minimum of the elements in column k of the cost matrix. For the DART root, the change index is expressed as the product of root fitness and the mean of the change indices for the DART leaves. Although change index calculations use the cost matrix, the calculations do not require the cost matrix to be evaluated.

---

Algorithm 2

---

1. Generate the cost matrix and compute change indices for the leaves of DART D:
   for k = 0 ... $m_1 - 2$
   for j = 0 ... $m_0 - 2$ $$c_{j,k} = 1 - \tilde{p}_k(a(V_0(\Omega_0) \to V_{j+1}(\Omega_0)) \mid D) \cdot \frac{s(V_{j+1}(\Omega_0)) + s(V_{k+1}(\Omega_1))}{2}$$

$$\tau_{k+1} = \min_{j=0 \ldots m_0-2} c_{j,k}$$

2. Compute the change index for the root of DART D:

$$\tau_0 = \frac{s(V_0(\Omega_0)) + s(V_0(\Omega_1))}{2} \cdot \frac{1}{m_1 - 1} \sum_{k=1}^{m_1-1} \tau_k$$

---

The road assessment server learns the true structure of the network of previously detected occurrences over time by updating the road damage database in real time as the vehicle moves down-track. Occurrences never before seen are newly inserted into the road damage database with their computed attribute values. Attributes of previously seen occurrences are updated recursively with attribute values for the most recently acquired instances of those occurrences (i.e., the corresponding newly detected occurrences). Updates to the road damage database facilitate change detection for occurrences that may be encountered in the future. Also, the performance of the road assessment server benefits over time from improvements in the accuracy of the road damage database.

As for change index calculations, the road assessment server generates a cost matrix in order to update the road damage database. However, in order to update the road damage database, the road assessment server also evaluates the cost matrix by solving a minimal cost assignment problem. The result of the cost matrix evaluation may be that for k=0 ... $m_1$ –1, occurrence k of $\Omega_1$ is assigned to occurrence j(k) of $\Omega_0$, where j(k)<0 if occurrence k of $\Omega_1$ is new (unassigned). If occurrence $V_k(\Omega_1)$ is unassigned, the road assessment server adds that occurrence to the road damage database as a new occurrence. Otherwise, the road assessment server updates the attributes of occurrence $V_{j(k)}(\Omega_0)$ in the road damage database recursively with the attributes of newly detected occurrence $V_k(\Omega_1)$.

Figure 4:
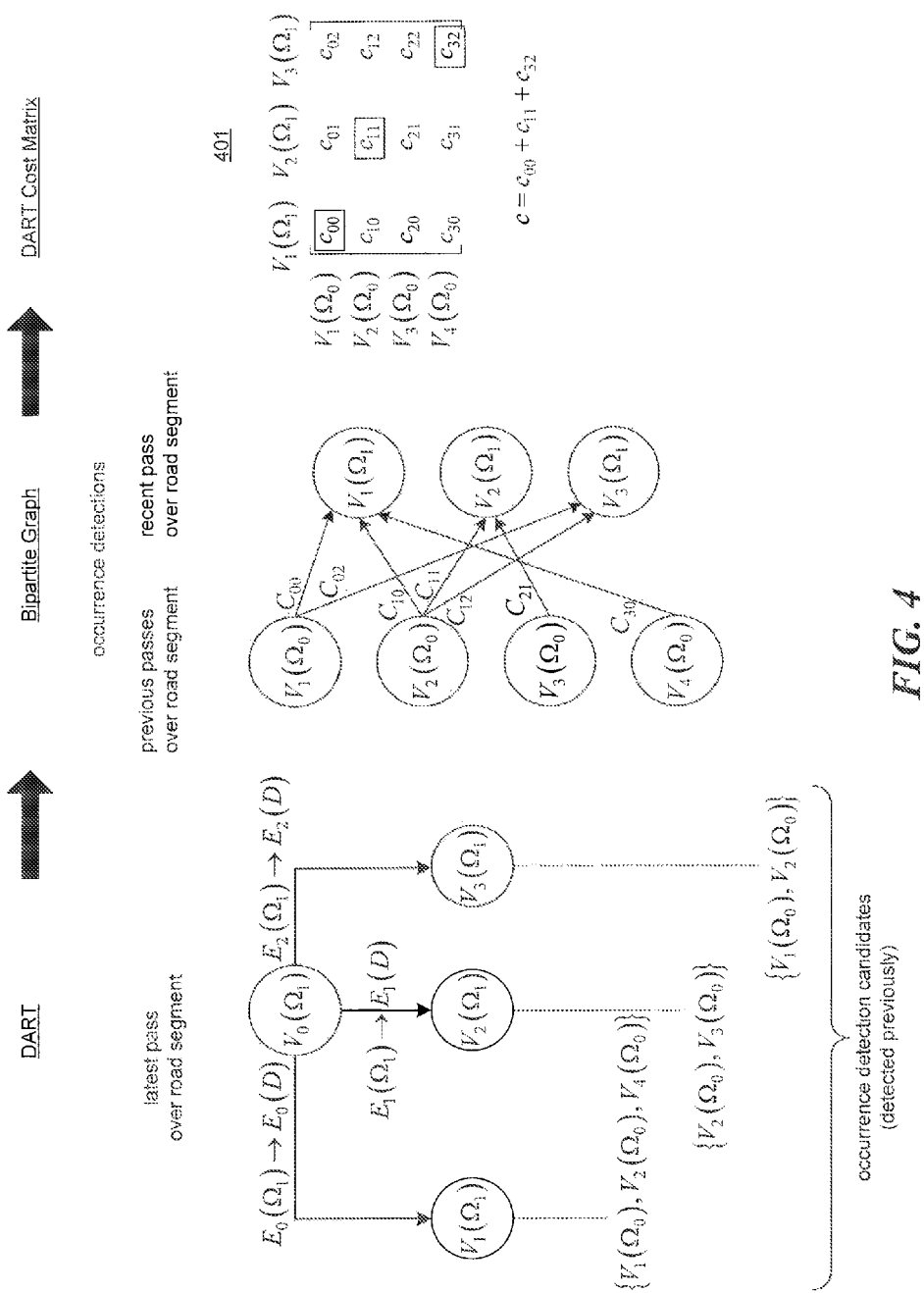
FIG. 4 illustrates the process of assigning previously detected occurrences to newly detected occurrences.

FIG. 4 illustrates the process of assigning previously detected occurrences to newly detected occurrences. After generating the cost matrix 401, the road assessment server applies the minimal cost algorithm to identify the pairs of previously and newly detected occurrences that result in the minimal cost. In the example of FIG. 4, the pairs of occurrences $V_1(\Omega_0)$ and $V_1(\Omega_1)$, $V_2(\Omega_0)$ and $V_2(\Omega_1)$, and $V_4(\Omega_0)$ and $\Omega_3(\Omega_1)$ have the minimal cost of assignment. In addition to the occurrence attributes of Table 1, the road assessment server may also maintain occurrence attributes that include the number of times an occurrence was detected (e.g., to assist in the recursive updating) and its maximum fitness over all detections.

Figure 5:
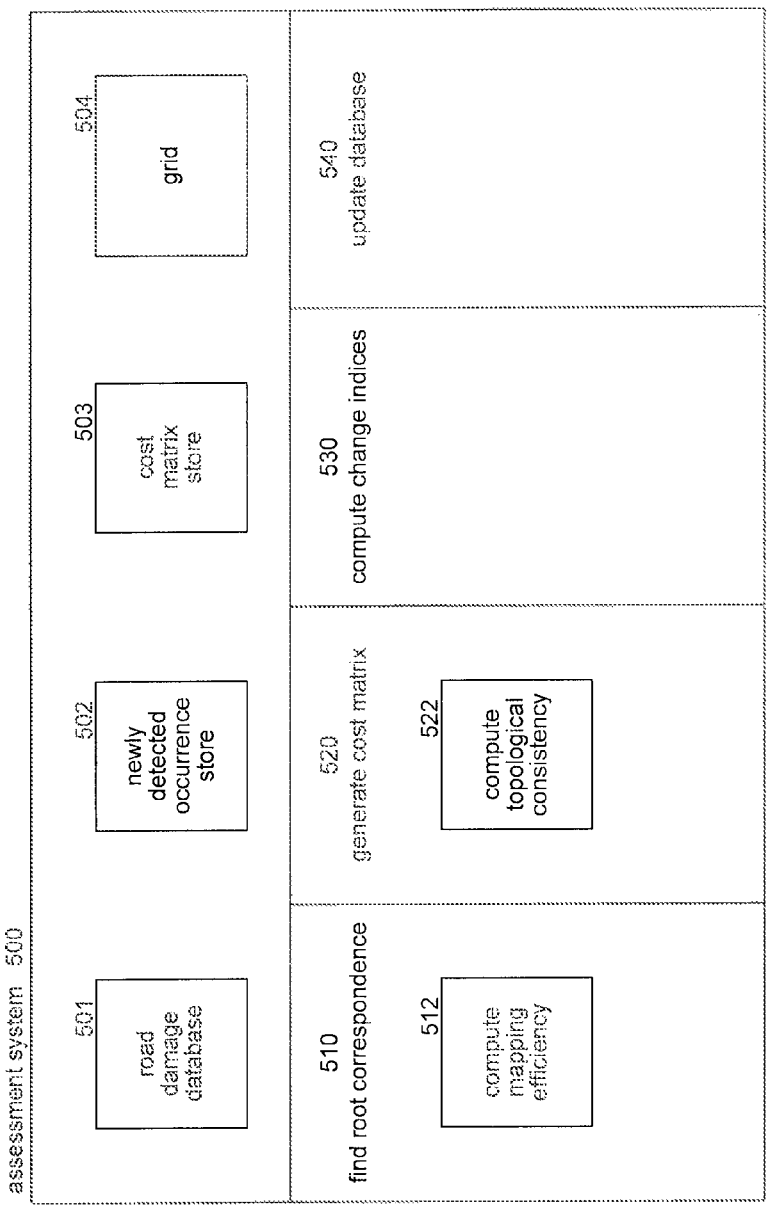
FIG. 5 is a block diagram of components of the assessment system of the road assessment server in some embodiments.

FIG. 5 is a block diagram of components of the assessment system of the road assessment server in some embodiments. The assessment system 500 includes a road damage database 501, a newly detected occurrence store 502, a cost matrix store 503, and a grid data structure 504 for root correspondence calculations. The road damage database contains the occurrences detected on previous scans and their attributes. The newly detected occurrence store contains the occurrences detected on the latest scan along with their attributes. The cost matrix store is used by the assessment system to store the cost matrix. The grid data structure identifies the cubic cells within the xyz space of a localized portion of the scan that contain previously detected occurrences. The assessment system also includes a "find root correspondence" component 510, a "generate cost matrix" component 520, a "compute change indices" component 530, and an "update database" component 540. The "find root correspondence" component invokes a "compute mapping efficiency" component 512 to calculate a mapping efficiency and then identifies the root correspondence based on the mapping efficiencies. The "generate cost matrix" component invokes a "compute topological consistency" component 522 to generate the costs for pairs of previously and newly detected occurrences. The "compute change indices" component computes the change index for each newly detected occurrence based on the cost matrix. The "update database" component updates the road damage database based on the correspondence between previously and newly detected occurrences as determined from the cost matrix.

The computing devices—servers and pods—on which the road assessment system may be implemented may include a central processing unit and memory and may include, particularly in the case of a system management workstation, input devices (e.g., keyboard and pointing devices), output devices (e.g., display devices), and storage devices (e.g., disk drives). Computer-readable media include computer-readable storage media and data transmission media. The computer-readable storage media include memory and other storage devices that may have recorded upon or may be encoded with computer-executable instructions or logic that implement the road assessment system. The data transmission media is media for transmitting data using signals or carrier waves (e.g., electromagnetism) via a wire or wireless connection. Various functions of the road assessment server may also be implemented on devices using discrete logic or logic embedded as an application-specific integrated circuit. The road assessment pod may be implemented on a computer system that is local to a vehicle to which a linear array of ground-penetrating radar antennas is mounted for processing the return signals locally. Alternatively, one or more of the components may be implemented on a computer system that is remote from the linear array. In such an alternative, the data used by the various components (e.g., return signals and image frames) may be transmitted between the local computing system and remote computer system and between remote computing systems.

The road assessment system may be described in the general context of computer-executable instructions, such as program modules, executed by one or more computers or other devices. Generally, program modules include routines, programs, occurrences, components, data structures, and so on that perform particular tasks or implement particular abstract data types. Typically, the functionality of the program modules may be combined or distributed as desired in various embodiments.

Figure 6:
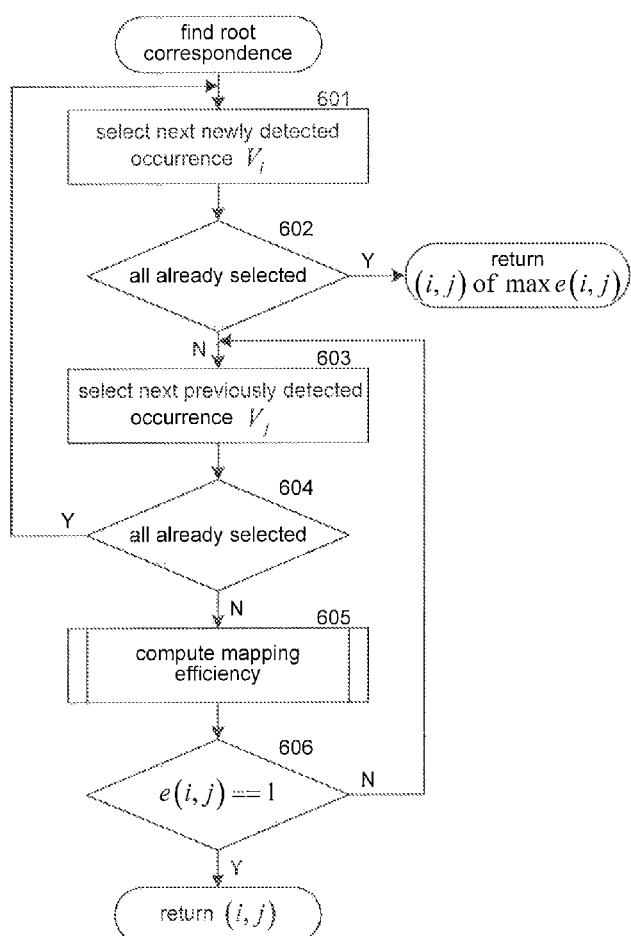
FIG. 6 is a flow diagram that illustrates the processing of the "find root correspondence" component of the road assessment server in some embodiments.

FIG. 6 is a flow diagram that illustrates the processing of the "find root correspondence" component of the road assessment server in some embodiments. The component calculates the mapping efficiency for pairs of previously and newly detected occurrences. In block 601, the component selects the next newly detected occurrence. In decision block 602, if all the newly detected occurrences have already been selected, then the component returns a pair of previously and newly detected occurrences for which the mapping efficiency is largest as the root correspondence, else the component continues at block 603. In block 603, the component selects the next previously detected occurrence. In decision block 604, if all the previously detected occurrences have already been selected, then the component loops to block 601 to select the next newly detected occurrence, else the component continues at block 605. In block 605, the "compute mapping efficiency" component calculates the mapping efficiency for a hypothetical root correspondence between a specific pair of previously and newly detected occurrences. In decision block 606, if the mapping efficiency is perfect, then the component returns the previously and newly detected occurrence selected as the root correspondence, else the component loops to block 603 to select the next previously detected occurrence.

Figure 7:
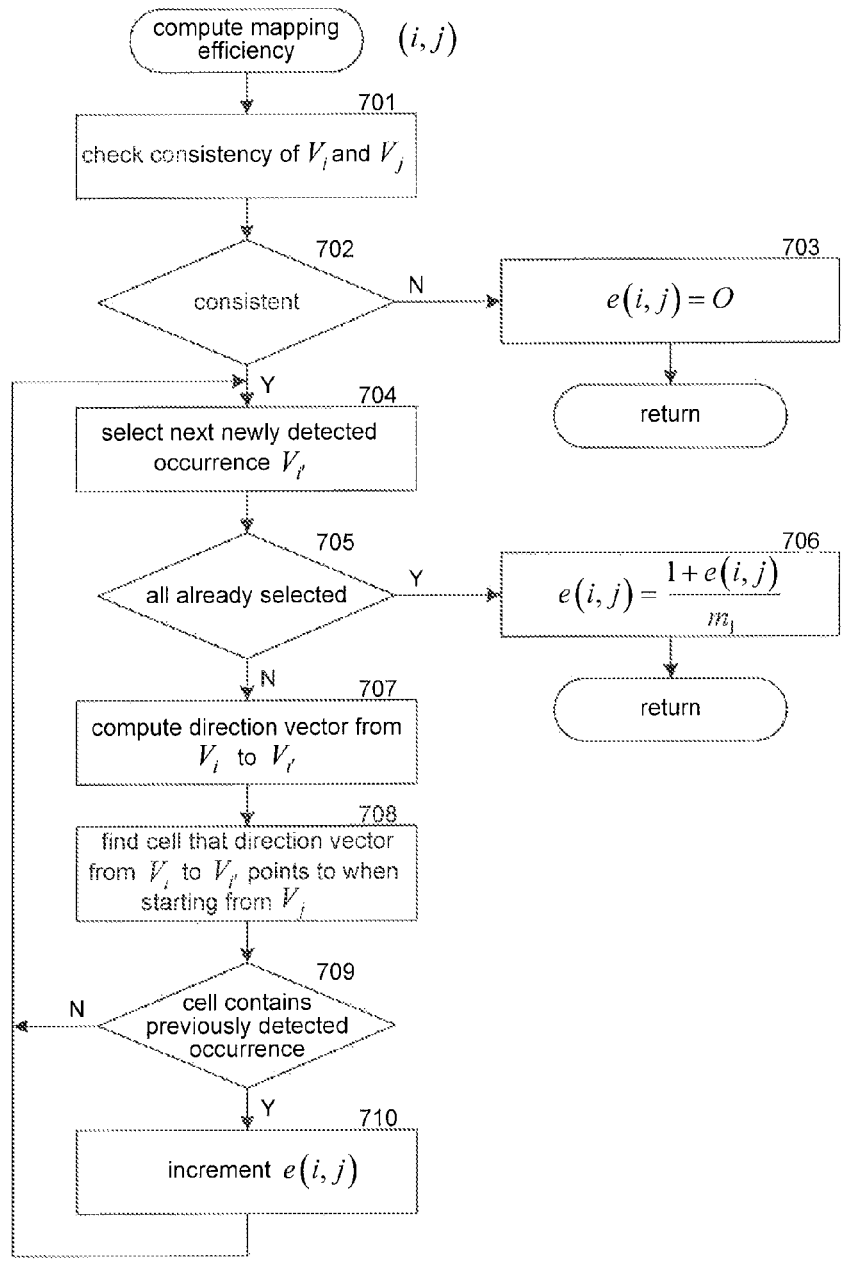
FIG. 7 is a flow diagram that illustrates the processing of the "compute mapping efficiency" component of the road assessment server in some embodiments.

FIG. 7 is a flow diagram that illustrates the processing of the "compute mapping efficiency" component of the road assessment server in some embodiments. The component computes mapping efficiency for a hypothetical root correspondence between a pair of previously and newly detected occurrences passed in as input. In block 701, the component checks consistency of the vertex attributes of the previously detected occurrence and the newly detected occurrence to ensure, for example, that the elongation and orientation are similar enough to indicate that they may represent the same occurrence. In decision block 702, if the attributes are consistent, then the component continues at block 704, else the component continues at block 703. In block 703, the component sets the mapping efficiency to zero, indicating that the input pair of previously and newly detected occurrences cannot represent a root correspondence, and then returns. In block 704, the component selects the next newly detected occurrence from the set of newly detected occurrences in the vicinity of the input newly detected occurrence. In decision block 705, if all newly detected occurrences in the vicinity have already been selected, then the component continues at block 706, else the component continues at block 707. In block 706, the component computes the mapping efficiency for the input pair of previously and newly detected occurrences, and then returns. In block 707, the component computes a direction vector from the newly detected occurrence of the input pair to the selected newly detected occurrence. In block 708, the component determines the cubic grid cell of the grid data structure that contains the endpoint of the direction vector, assuming it starts at the previously detected occurrence of the input pair. In decision block 709, if the cubic grid cell contains a previously detected occurrence, then the component continues at block 710, else the component loops to block 704 to select the next newly detected occurrence in the vicinity of the input newly detected occurrence. In block 710, the component increments the mapping efficiency for the input pair and then loops to block 704 to select the next newly detected occurrence in the vicinity of the input newly detected occurrence.

Figure 8:
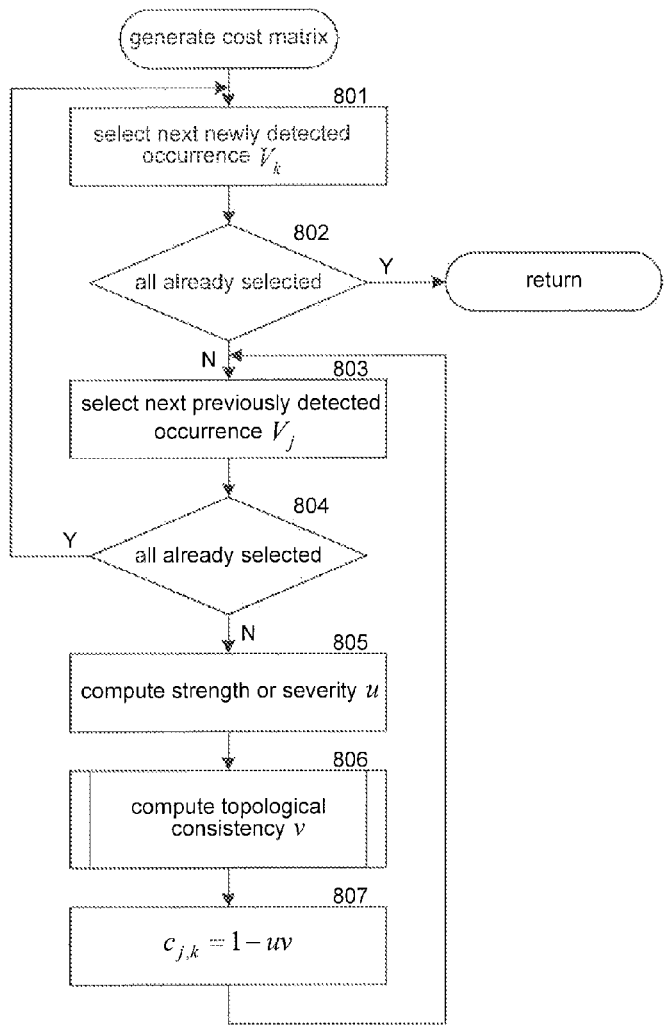
FIG. 8 is a flow diagram that illustrates the processing of the "generate cost matrix" component of the road assessment server in some embodiments.

FIG. 8 is a flow diagram that illustrates the processing of the "generate cost matrix" component of the road assessment server in some embodiments. The previously and newly detected occurrences in the root correspondence are supplied as input to this component. In block 801, the component selects the next newly detected occurrence in the vicinity of the newly detected occurrence of the root pair. In decision block 802, if all such occurrences have already been selected, then the component returns, else the component continues at block 803. In block 803, the component selects the next previously detected occurrence in the vicinity of the previously detected occurrence of the root pair. In decision block 804, if all such occurrences have already been selected, then the component loops to block 801 to select the next newly detected occurrence in the vicinity of the newly detected occurrence of the root pair, else the component continues at block 805. In block 805, the component calculates the fitness u of the selected pair of previously and newly detected occurrences. In block 806, the component invokes the "compute topological consistency" component to calculate topological consistency v for the selected pair of previously and newly detected occurrences. In block 807, the component generates the cost of assigning the selected previously detected occurrence to the selected newly detected occurrence from the fitness u and the topological consistency v, and then loops to block 803 to select the next previously detected occurrence in the vicinity of the previously detected occurrence of the root pair.

Figure 9:
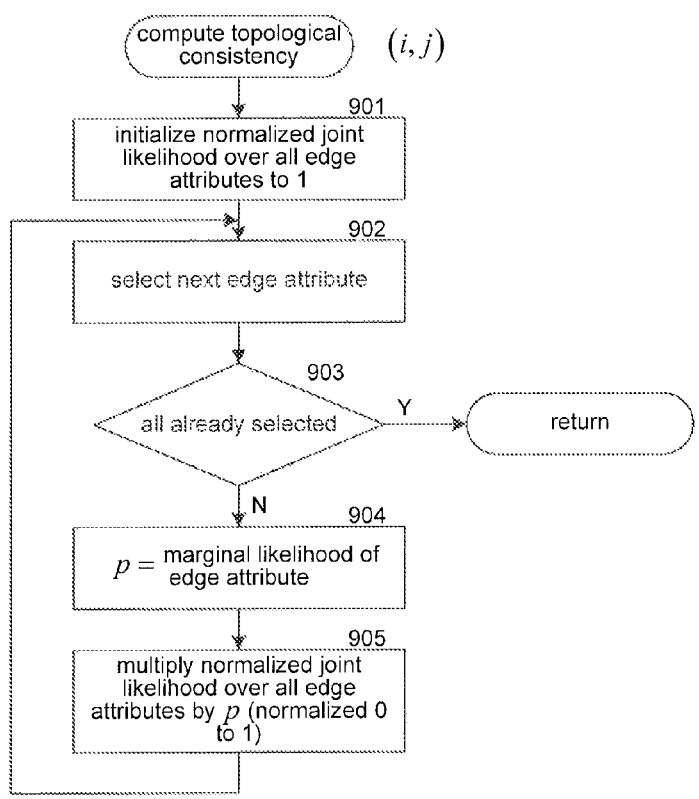
FIG. 9 is a flow diagram that illustrates the processing of the "compute topological consistency" component of the road assessment server in some embodiments.

FIG. 9 is a flow diagram that illustrates the processing of the "compute topological consistency" component of the road assessment server in some embodiments. For a pair of previously and newly detected occurrences, the inputs to this component are (i) the DART that contains the newly detected occurrence and (ii) the edge connecting the previously detected occurrence to the previously detected occurrence of the root pair. The output of this component is the degree of topological consistency (from 0 to 1) between (i) the edge connecting the newly detected occurrence to the newly detected occurrence of the root pair in the DART and (ii) the edge connecting the previously detected occurrence to the previously detected occurrence of the root pair in the road damage database. In block 901, the component initializes the normalized joint likelihood over all edge attributed to 1. In block 902, the component selects the next edge attribute. In decision block 903, if all attributes associated with the edge connecting previously detected occurrences of damage to its root have already been selected, then the component returns the joint likelihood of attributes for the edge in (ii) above given the DART in (i) above normalized to a value from 0 to 1 using Equation 1a, else the component continues to block 904. In block 904, the component computes the normalized marginal likelihood for the next selected attribute of the edge connecting previously detected occurrences using Equation 1b. In block 905, the component updates the product of normalized likelihoods over all edge attributes with the marginal likelihood from block 904, in accordance with Equation 1a, and then loops to block 902 to select the next edge attribute.

Figure 10:
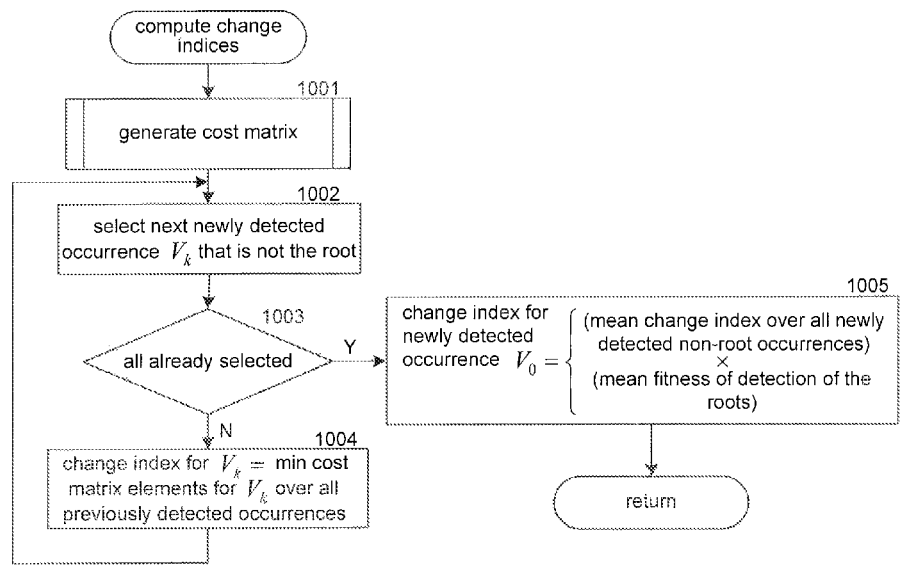
FIG. 10 is a flow diagram that illustrates the processing of the "compute change indices" component of the road assessment server in some embodiments.

FIG. 10 is a flow diagram that illustrates the processing of the "compute change indices" component of the road assessment server in some embodiments. The component generates the cost matrix and identifies the change index for each newly detected occurrence. In block 1001, the component invokes the "generate cost matrix" component. In block 1002, the component selects the next newly detected occurrence that is not the newly detected occurrence of the root pair. In decision block 1003, if all such newly detected occurrences have already been selected, then the component continues at block 1005, else the component continues at block 1004. In block 1004, the component computes the change index for the selected newly detected occurrence as the minimum of cost matrix elements for that newly detected occurrence over all previously detected occurrences other than the previously detected occurrence of the root pair, and then loops to block 1002 to select the next newly detected occurrence. In block 1005, the component computes the change index for the newly detected occurrence of the root pair as the product of the mean of change indices over all newly detected non-root occurrences and the mean of fitnesses for the occurrences in the root pair, and then returns.

Figure 11:
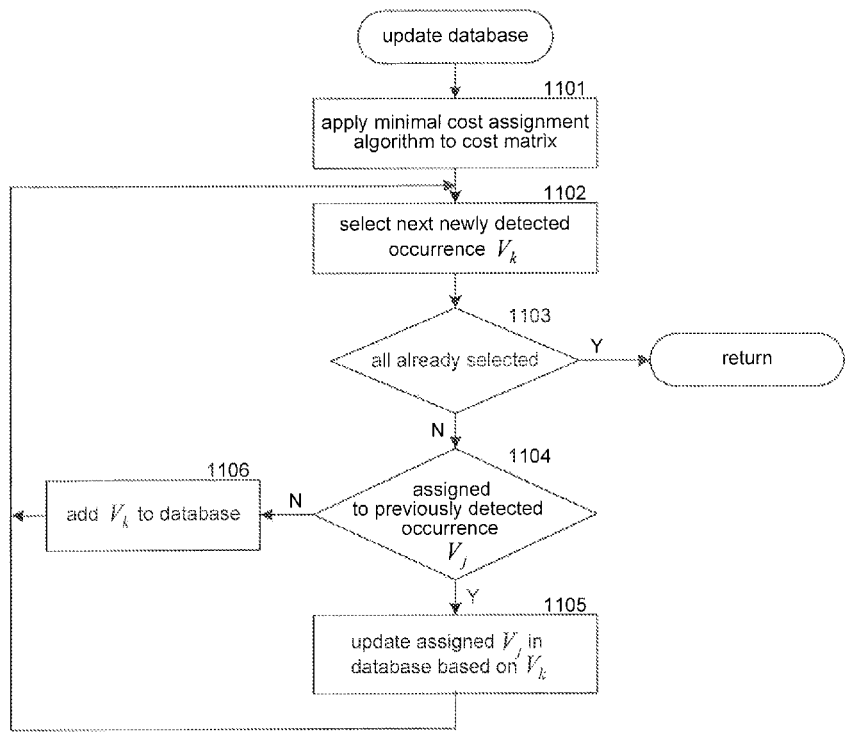
FIG. 11 is a flow diagram that illustrates the processing of the "update road damage database" component of the road assessment server in some embodiments.

FIG. 11 is a flow diagram that illustrates the processing of the "update road damage database" component of the road assessment server in some embodiments. The component updates the road damage database based on a minimal cost assignment of previously detected occurrences to newly detected occurrences. In block 1101, the component applies a minimal cost assignment algorithm to the cost matrix (i.e., it evaluates the cost matrix) to determine the most likely correspondences of previously detected occurrences to newly detected occurrences. In block 1102, the component selects the next newly detected occurrence. In decision block 1103, if all the newly detected occurrences have already been selected, then the component returns, else the component continues at block 1104. In decision block 1104, if the selected newly detected occurrence has been assigned to a previously detected occurrence, then the component continues at block 1105, else the component continues at block 1106. In block 1105, the component updates the attributes of this previously detected occurrence in the road damage database with attributes of the selected newly detected occurrence, and then loops to block 1102 to select the next newly detected occurrence. In block 1106, the component adds the selected newly detected occurrence to the database as a new occurrence and then loops to block 1102 to select the next newly detected occurrence.

Figure 12:
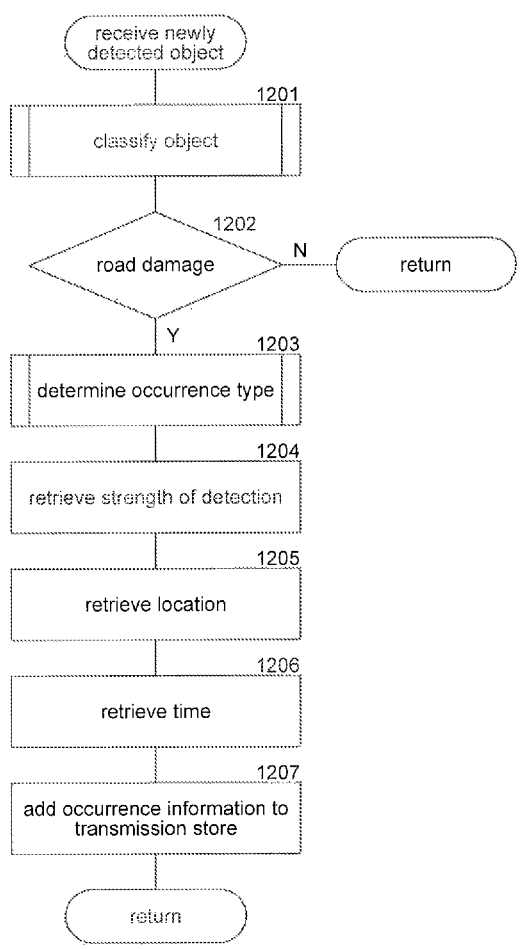
FIG. 12 is a flow diagram that illustrates the processing of a "receive newly detected object" component of a road assessment pod in some embodiments.

FIG. 12 is a flow diagram that illustrates the processing of a "receive newly detected object" component of a road assessment pod in some embodiments. The component is invoked when the imaging and detection system detects a new object and determines whether the object represents road damage. In block 1201, the component invokes the "classify object" component to classify the object as being road damage or not road damage. This component may apply a vector of detection features to a trained binary classifier, which returns a decision of "road damage" or "not road damage." In various embodiments, the component can use a trained linear, neural network, maximum likelihood classifier, and so on. In various embodiments, the component can, for example, use detection features such as area (size), elongation, roundness, and so on. In decision block 1202, if the object is classified as road damage, then the component continues at block 1203, else the component returns. In block 1203, the component invokes the "determine occurrence type" component to determine the type of road damage. In block 1204, the component retrieves the strength of detection attribute of the occurrence for example, factoring in the width, length, area (size), and brightness (energy) of the damage (e.g., a crack). In block 1205, the component retrieves the location of the occurrence.

In block 1206, the component retrieves the time of the occurrence. In some embodiments, the component may also calculate the severity of the damage by, for example, factoring in the width and length of a crack, strength of detection, and so on. In block 1207, the component adds occurrence information for the newly detected occurrence to the transmission store and then returns.

Figure 13:
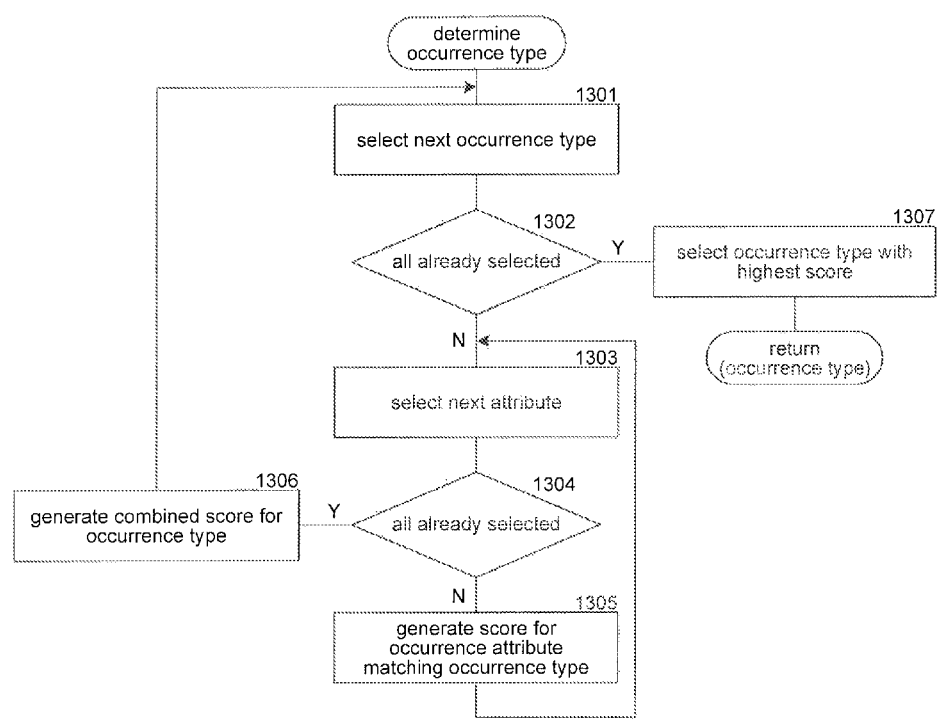
FIG. 13 is a flow diagram that illustrates the processing of a "determine occurrence type" component of the road assessment pod in some embodiments.

FIG. 13 is a flow diagram that illustrates the processing of a "determine occurrence type" component of the road assessment pod in some embodiments. The component is passed an indication of an occurrence (also called a feature vector for a newly detected occurrence) and determines the occurrence type or road damage type for that occurrence. In block 1301, the component selects the next possible occurrence type. In decision block 1302, if all the occurrence types have already been selected, then the component continues at block 1307, else the component continues at block 1303. In block 1303, the component selects the next attribute of the passed occurrence. In decision block 1304, if all the attributes for the passed occurrence have already been selected, then the component continues at block 1306, else the component continues at block 1305. In block 1305, the component generates a score for the selected attribute matching the selected occurrence type and then loops to block 1303 to select the next attribute of the passed occurrence. For example, the score for an occurrence type of pothole may be increased when the ratio of the length to the width of the occurrence is approximately one. In contrast, the score of an occurrence type of crack may decrease when the ratio is approximately one. The score may be generated using a classifier trained on using training data of attributes and corresponding occurrence types. In block 1306, the component generates a combined score for the attribute type indicating how well the passed occurrence matches that attribute type and then loops to block 1301 to select the next occurrence type. In block 1307, the component selects the occurrence type with the highest score and then returns that occurrence type as the type of road damage represented by the passed occurrence. In another embodiment, the component may apply a vector of occurrence features to a trained multi-category classifier, which returns a decision as to the type of road damage occurrence. In various embodiments, the component can use a trained linear, neural network, maximum likelihood classifier, and so on. In various embodiments, the classifier can, for example, use occurrence features such as area (size), elongation, roundness, and so on.

Figure 14:
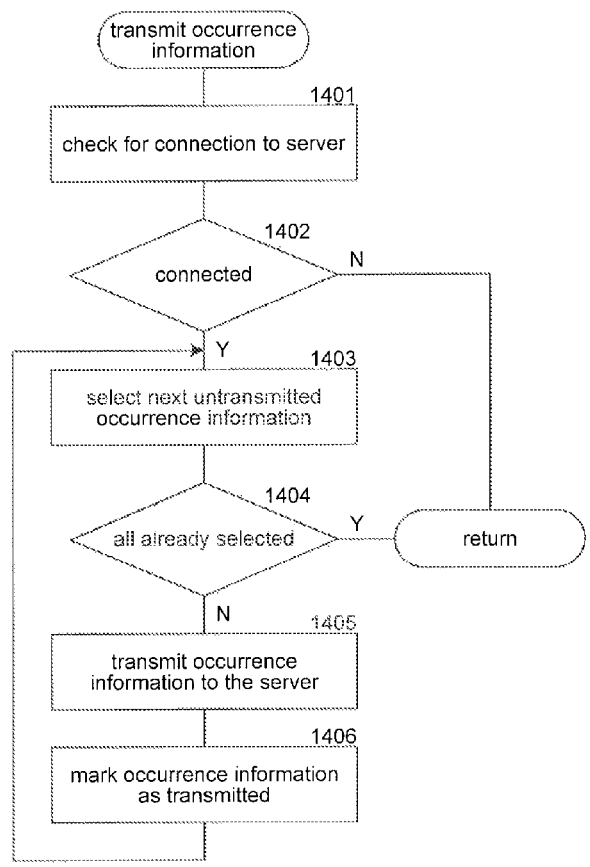
FIG. 14 is a flow diagram that illustrates the processing of a "transmit occurrence information" component of the road assessment pod in some embodiments.

FIG. 14 is a flow diagram that illustrates the processing of a "transmit occurrence information" component of the road assessment pod in some embodiments. The component may be invoked periodically to transmit assessment information to the road assessment server. In block 1401, the component checks whether there is a current connection to the server. In decision block 1402, if there is a current connection, then the component continues at block 1403, else the component returns. In block 1403, the component selects the next occurrence information that has not been transmitted. In decision block 1404, if all the occurrence information has already been transmitted, then the component returns, else the component continues at block 1405. In block 1405, the component transmits the selected occurrence information to the road assessment server. In block 1406, the component marks the selected occurrence information as having been transmitted and then loops to block 1403 to select the next occurrence information that has not yet been transmitted.

Figure 15:
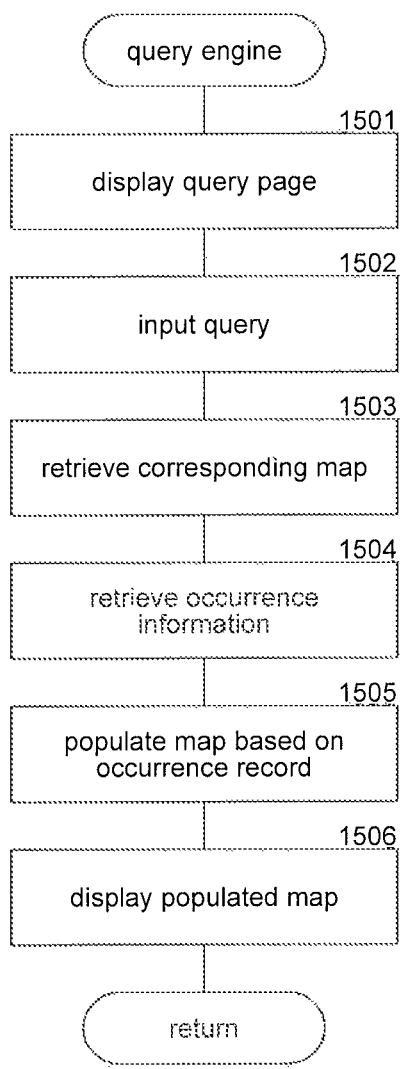
FIG. 15 is a flow diagram that illustrates the processing of a "query engine" component of the road assessment server in some embodiments.

FIG. 15 is a flow diagram that illustrates the processing of a "query engine" component of the road assessment server in some embodiments. In block 1501, the component displays a query page so that a user may enter query parameters. In block 1502, the component inputs the query parameters. In block 1503, the component retrieves a portion of the map corresponding to area of interest referred to by the query parameters. For example, the user may specify to view the road damage information for a certain city or street. In block 1504, the component retrieves from the road damage database the recorded road damage occurrence information that matches the query parameters. For example, the user may specify to review only certain types of road damage (e.g., potholes) with only a certain severity level along a selected road. In block 1505, the component populates the map to indicate the retrieved occurrence records. In block 1506, the component displays the populated map and then returns.

From the foregoing, it will be appreciated that specific embodiments of the invention have been described herein for purposes of illustration, but that various modifications may be made without deviating from the scope of the invention. For example, a road assessment pod may also transmit to the road assessment server images generated by the detection system to detect objects. Because the images may contain large amounts of data, the images may be transmitted after inspection of a road has been completed (e.g., not in real time) and may be compressed. The road assessment pod may also be used to check for damage to railroad tracks, monorails, light rail tracks, subway tracks, and so on. As used herein, the term "road" refers to any surface over which a vehicle with an assessment pod can travel. Accordingly, the invention is not limited except as by the appended claims.

We claim:

1. A system for inspecting roads comprising:
   a road assessment pod capable of being coupled to a vehicle, the road assessment pod including:
      a collection of antennas for emitting ground-penetrating radar and receiving return signals as the vehicle travels down a road;
      a damage assessment component that analyzes the return signals to detect occurrences of damage and that determines the type of each occurrence of damage; and
      a transmission component that, for each occurrence of damage, transmits occurrence information that includes location and type of the occurrences; and
   a road assessment server including:
      a component that receives the occurrence information transmitted by the road assessment pod;
      a correspondence component that identifies correspondences between newly detected occurrences and previously detected occurrences;
      a component that, when no correspondence is identified between a newly detected occurrence and any previously detected occurrence, indicates that the newly detected occurrence represents damage not previously detected; and
      a component that, when a correspondence is identified between a newly detected occurrence and a previously detected occurrence, updates information for that previously detected occurrence based on that newly detected occurrence.

2. The system of claim 1 wherein the correspondence component includes a component that identifies a root correspondence between a newly detected occurrence and a previously detected occurrence and then identifies correspondences between other newly detected occurrences and previously detected occurrences based on that root correspondence.

3. The system of claim 2 wherein the correspondence component includes a component that identifies correspondences between other newly detected occurrences and previously detected occurrences further based on locations of the occurrences relative to the root correspondence.

4. The system of claim 3 wherein the correspondence component includes a component that identifies correspondences between other newly detected occurrences and previously detected occurrences further based on types of the occurrences.

5. The system of claim 1 wherein the road assessment server further comprising a component that provides a user interface for receiving from a user a query relating to road damage and for displaying a map indicating locations of road damage.

6. The system of claim 1 wherein the damage assessment component further comprising a detection component that detects objects from the return signals and a classification component that classifies the detected objects as representing road damage or not representing road damage.

7. The system of claim 1 wherein the road assessment server includes a component that receives transmitted occurrence information from a plurality of road assessment pods.

8. The system of claim 1 wherein the road assessment server further comprising a component that provides instructions to the road assessment pod indicating a road that the road assessment pod is to inspect for damage.

9. A road assessment pod for collecting road damage information as a vehicle travels down a road, the road assessment pod comprising:
   a collection of antennas for emitting ground-penetrating radar and receiving return signals as the vehicle travels down a road;
   a detection component that analyzes the return signals to detect objects on or below the surface of the road;
   a classification component that determines whether a detected object represents an occurrence of road damage;
   a type component that determines a type of each occurrence of damage; and
   a transmission component that, for each occurrence of damage, transmits occurrence information that includes location and type of the occurrence.

10. The road assessment pod of claim 9 wherein the collection of antennas further comprising transceivers that operate in multistatic mode.

11. The road assessment pod of claim 9 further comprising a navigation component that determines current location of the road assessment pod.

12. The road assessment pod of claim 9 wherein the road assessment pod is connected to power provided by the vehicle on which it is mounted.

13. The road assessment pod of claim 9 further comprising a component that transmits images generated by the detection component to a road assessment server.

14. A road assessment system for collecting road damage information from road assessment pods as vehicles on which the road assessment pods are mounted travel down a road, comprising:
   a component that receives occurrence information transmitted by road assessment pods, the occurrence information indicating newly detected occurrences of damage to the road;
   a correspondence component that identifies correspondences between newly detected occurrences and previously detected occurrences;
   a component that, when no correspondence is identified between a newly detected occurrence and any previously detected occurrence, indicates that the newly detected occurrence represents damage not previously detected; and a component that, when a correspondence is identified between a newly detected occurrence and a previously detected occurrence, updates information for that previously detected occurrence based on that newly detected occurrence.

15. The system of claim 14 wherein the correspondence component includes a component that identifies a root correspondence between a newly detected occurrence and a previously detected occurrence and then identifies correspondences between other newly detected occurrences and previously detected occurrences based on that root correspondence.

16. The system of claim 15 wherein the correspondence component includes a component that identifies correspondences between other newly detected occurrences and previously detected occurrences further based on locations of the occurrences relative to the root correspondence.

17. The system of claim 16 wherein the correspondence component includes a component that identifies correspondences between other newly detected occurrences and previously detected occurrences further based on types of the occurrences.

18. The system of claim 14 further comprising a component that provides a user interface for receiving from a user a query relating to road damage and for displaying a map indicating locations of road damage.

19. A method for inspecting roads, the method comprising:

collecting by a road assessment pod road damage information as a vehicle on which the road assessment pod is mounted travels down a road, the road assessment pod using ground-penetrating radar to identify occurrences of damage to the road;

transmitting by the road assessment pod occurrence information in real time to a road assessment server, the occurrence information including location and type of each occurrence of damage identified by the road assessment pod; and processing by the road assessment server the occurrence information to identify new occurrences of damage and changes to existing occurrences of damage based on the locations of newly detected occurrences of damage compared to locations of previously detected occurrences of damage.

* * * * *